(12) United States Patent
Zhang et al.

(10) Patent No.: US 12,366,725 B2
(45) Date of Patent: Jul. 22, 2025

(54) OPTICAL IMAGING LENS

(71) Applicant: GENIUS ELECTRONIC OPTICAL (XIAMEN) CO., LTD., Fujian (CN)

(72) Inventors: Jiayuan Zhang, Fujian (CN); Qingzhi Zhu, Fujian (CN); Huabin Liao, Fujian (CN); Hung-Chien Hsieh, Fujian (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 603 days.

(21) Appl. No.: 17/835,985

(22) Filed: Jun. 9, 2022

(65) Prior Publication Data

US 2023/0204913 A1 Jun. 29, 2023

(30) Foreign Application Priority Data

Dec. 28, 2021 (CN) .......................... 202111623994.9

(51) Int. Cl.
*G02B 9/64* (2006.01)
*G02B 13/00* (2006.01)

(52) U.S. Cl.
CPC ........... *G02B 9/64* (2013.01); *G02B 13/0045* (2013.01)

(58) Field of Classification Search
CPC ........ G02B 9/64; G02B 13/0045; G02B 3/04; G02B 1/041; G02B 13/18
See application file for complete search history.

(56) References Cited

U.S. PATENT DOCUMENTS

2020/0026040 A1  1/2020  Teraoka
2021/0356699 A1*  11/2021  Lin ........................... G02B 9/64

FOREIGN PATENT DOCUMENTS

| CN | 110908084 |   | 3/2020 |   |
|---|---|---|---|---|
| CN | 110908084 | A * | 3/2020 | ......... G02B 13/0045 |
| CN | 111007635 |   | 4/2020 |   |
| CN | 112099203 |   | 12/2020 |   |
| CN | 112327456 |   | 2/2021 |   |

OTHER PUBLICATIONS

"Office Action of China Counterpart Application", issued on Feb. 21, 2024, p. 1-p. 7.

* cited by examiner

*Primary Examiner* — Ricky L Mack
*Assistant Examiner* — K Muhammad
(74) *Attorney, Agent, or Firm* — JCIPRNET

(57) ABSTRACT

An optical imaging lens including a first lens element, a second lens element, a third lens element, a fourth lens element, a fifth lens element, a sixth lens element, a seventh lens element, and an eighth lens element sequentially along an optical axis from an object side to an image side is provided. Each of the first lens element to the eighth lens element includes an object-side surface facing the object side and allowing imaging rays to pass through and an image-side surface facing the image side and allowing the imaging rays to pass through. A periphery region of the object-side surface of the third lens element is concave, and a periphery region of the image-side surface of the third lens element is convex. Lens elements of the optical imaging lens are only the above-mentioned eight lens elements, and the optical imaging lens satisfies the condition of $D11t62/D71t82 \leq 2.400$.

20 Claims, 26 Drawing Sheets

| First embodiment | | | | | | |
|---|---|---|---|---|---|---|
| EFL=6.384 mm, HFOV=40.803°, TTL=8.465 mm, Fno=1.500, ImgH=6.200 mm。 | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -0.853 | | | |
| First lens element 1 | Object-side surface 11 | 3.190 | 1.046 | 1.545 | 56.708 | 7.772 |
| | Image-side surface 12 | 11.331 | 0.064 | | | |
| Second lens element 2 | Object-side surface 21 | 6.540 | 0.330 | 1.681 | 18.154 | -28.585 |
| | Image-side surface 22 | 4.806 | 0.582 | | | |
| Third lens element 3 | Object-side surface 31 | 10.423 | 0.345 | 1.573 | 37.666 | -1886.681 |
| | Image-side surface 32 | 10.198 | 0.151 | | | |
| Fourth lens element 4 | Object-side surface 41 | 19.422 | 0.894 | 1.545 | 56.708 | 12.043 |
| | Image-side surface 42 | -9.790 | 0.264 | | | |
| Fifth lens element 5 | Object-side surface 51 | -8.460 | 0.634 | 1.614 | 25.754 | -15.533 |
| | Image-side surface 52 | -72.817 | 0.364 | | | |
| Sixth lens element 6 | Object-side surface 61 | 10.347 | 0.704 | 1.545 | 56.708 | 32.266 |
| | Image-side surface 62 | 24.448 | 0.049 | | | |
| Seventh lens element 7 | Object-side surface 71 | 3.168 | 0.352 | 1.573 | 37.666 | 12.954 |
| | Image-side surface 72 | 5.285 | 1.314 | | | |
| Eighth lens element 8 | Object-side surface 81 | -42.104 | 0.581 | 1.545 | 56.708 | -6.063 |
| | Image-side surface 82 | 3.613 | 0.272 | | | |
| Filter F | Object-side surface F1 | Infinity | 0.210 | 1.560 | 51.300 | |
| | Image-side surface F2 | Infinity | 0.307 | | | |
| | Image plane 99 | Infinity | | | | |

FIG. 8

| Surface | K | $a_4$ | $a_6$ | $a_8$ | $a_{10}$ |
|---|---|---|---|---|---|
| 11 | 3.008833E-01 | -6.736338E-04 | 3.544932E-04 | -2.490320E-04 | 1.197183E-04 |
| 12 | 0.000000E+00 | -1.896982E-02 | 1.236577E-02 | -4.854755E-03 | 1.272194E-03 |
| 21 | 6.700322E+00 | -3.120810E-02 | 1.464522E-02 | -5.066131E-03 | 1.148963E-03 |
| 22 | -6.241190E-01 | -1.122857E-02 | 4.944991E-03 | 1.026244E-04 | -7.388925E-04 |
| 31 | 0.000000E+00 | -1.861694E-02 | 8.869831E-04 | -1.376249E-03 | 6.604723E-04 |
| 32 | -9.964170E+00 | -1.481238E-02 | -6.764888E-03 | 2.040565E-03 | -2.196320E-04 |
| 41 | 2.585672E-02 | 1.279539E-03 | -8.801488E-03 | 2.300702E-03 | 2.830753E-04 |
| 42 | -6.871913E-01 | 5.563740E-03 | -1.437290E-02 | 6.147616E-03 | -1.675946E-03 |
| 51 | 1.033155E+01 | -6.337111E-04 | -1.383831E-02 | 6.721525E-03 | -2.210866E-03 |
| 52 | -2.991413E-01 | -1.553532E-02 | -4.488908E-03 | 2.984104E-03 | -9.965169E-04 |
| 61 | -1.668386E+00 | -4.840163E-03 | -1.618952E-03 | 8.352382E-04 | -3.963025E-04 |
| 62 | -2.789667E-03 | -3.232398E-02 | 1.568149E-02 | -4.179357E-03 | 5.963575E-04 |
| 71 | -4.598776E+00 | -7.404445E-03 | 8.417023E-04 | -1.918680E-03 | 8.048602E-04 |
| 72 | 2.997676E-02 | 2.223908E-02 | -1.654234E-02 | 4.187930E-03 | -6.796436E-04 |
| 81 | 5.715853E+00 | -4.381604E-02 | 1.068042E-02 | -2.229328E-03 | 3.164401E-04 |
| 82 | -1.098412E+01 | -1.866533E-02 | 4.432168E-03 | -7.544189E-04 | 8.493452E-05 |
| Surface | $a_{12}$ | $a_{14}$ | $a_{16}$ | $a_{18}$ | $a_{20}$ |
| 11 | -3.340467E-05 | 5.070747E-06 | -3.397450E-07 | | |
| 12 | -2.145533E-04 | 2.068192E-05 | -8.432860E-07 | | |
| 21 | -1.668207E-04 | 1.355505E-05 | -4.129866E-07 | | |
| 22 | 3.432522E-04 | -6.986867E-05 | 5.835969E-06 | | |
| 31 | -2.861827E-04 | 6.473462E-05 | -5.464346E-06 | | |
| 32 | -1.112226E-06 | 2.299679E-06 | -2.839212E-08 | | |
| 41 | -1.745153E-04 | 2.477425E-05 | -1.215422E-06 | | |
| 42 | 3.326144E-04 | -4.004723E-05 | 2.062277E-06 | | |
| 51 | 6.339143E-04 | -1.292998E-04 | 1.587439E-05 | -1.045740E-06 | 2.767423E-08 |
| 52 | 2.486132E-04 | -4.141600E-05 | 4.170447E-06 | -2.280570E-07 | 5.542212E-09 |
| 61 | 8.786612E-05 | -1.041608E-05 | 6.860444E-07 | -2.347003E-08 | 1.788700E-10 |
| 62 | -5.092552E-05 | 2.822122E-06 | -1.027804E-07 | 2.212160E-09 | -2.485900E-11 |
| 71 | -1.780782E-04 | 2.316765E-05 | -1.784495E-06 | 7.549085E-08 | -1.347329E-09 |
| 72 | 7.372599E-05 | -5.276723E-06 | 2.384853E-07 | -6.159663E-09 | 6.942100E-11 |
| 81 | -2.765780E-05 | 1.492111E-06 | -4.892537E-08 | 9.002290E-10 | -7.170000E-12 |
| 82 | -6.347596E-06 | 3.097910E-07 | -9.477026E-09 | 1.648780E-10 | -1.242000E-12 |

FIG. 9

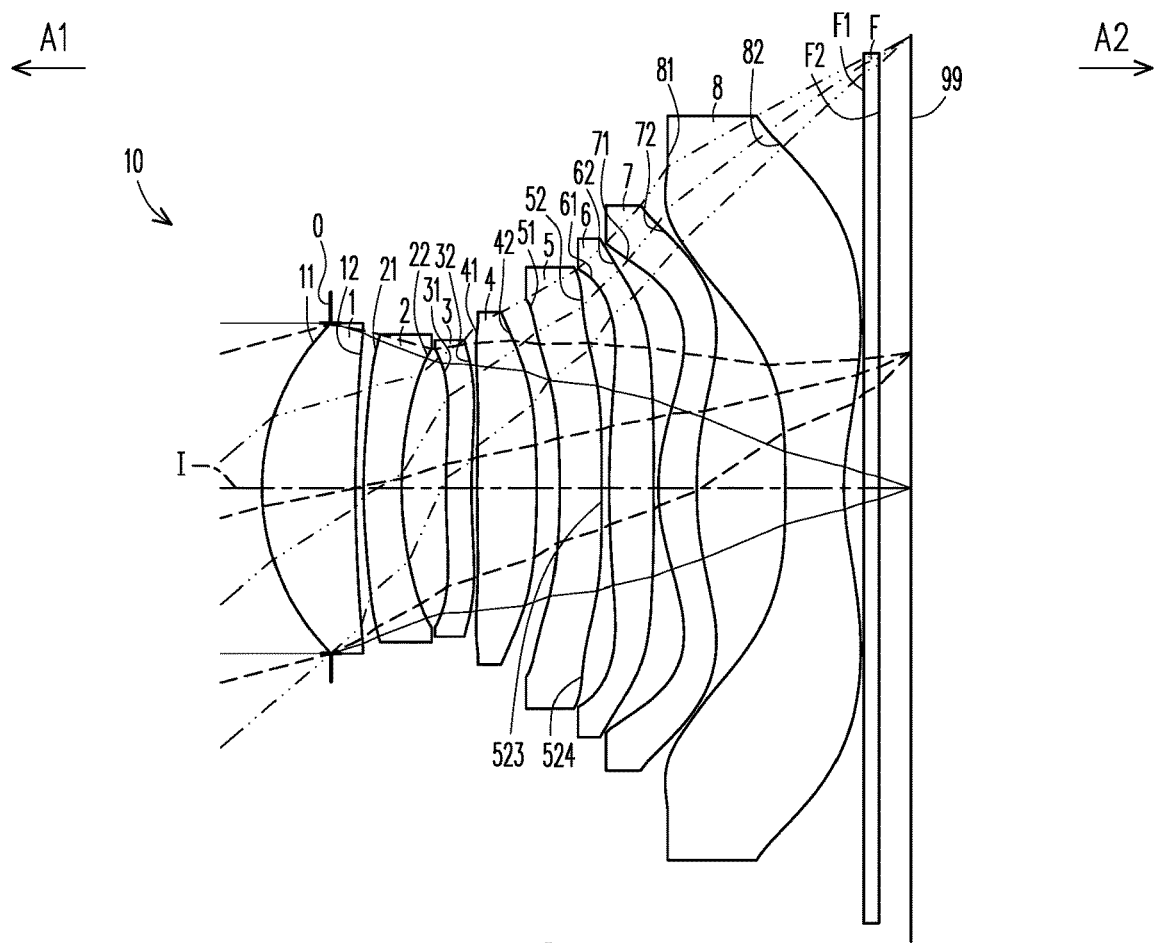
FIG. 10
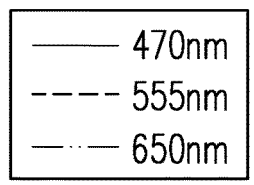
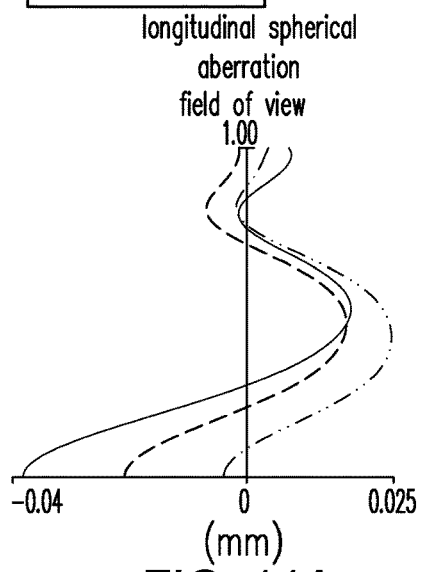
FIG. 11A
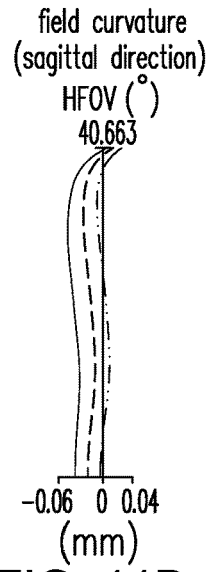
FIG. 11B
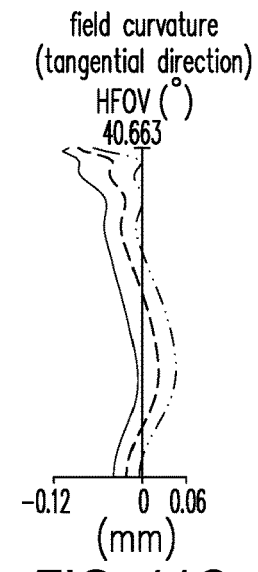
FIG. 11C
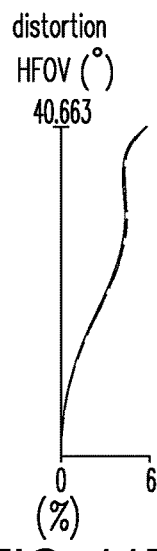
FIG. 11D

| Second embodiment ||||||
|---|---|---|---|---|---|
| EFL=6.785 mm, HFOV=40.663°, TTL=8.864 mm, Fno=1.500, ImgH=6.200 mm。 ||||||
| Device | Surface | Radius of curvature (mm) | Thickness (mm) | Refractive index | Abbe number | Focal length (mm) |
| Object | | Infinity | Infinity | | | |
| Aperture 0 | | Infinity | -0.935 | | | |
| First lens element 1 | Object-side surface 11 | 3.212 | 1.268 | 1.545 | 55.987 | 7.541 |
| | Image-side surface 12 | 12.542 | 0.115 | | | |
| Second lens element 2 | Object-side surface 21 | 7.448 | 0.522 | 1.661 | 20.373 | -22.118 |
| | Image-side surface 22 | 4.811 | 0.607 | | | |
| Third lens element 3 | Object-side surface 31 | 10.569 | 0.349 | 1.661 | 20.373 | -263.658 |
| | Image-side surface 32 | 9.838 | 0.079 | | | |
| Fourth lens element 4 | Object-side surface 41 | 37.062 | 0.815 | 1.545 | 55.987 | 18.442 |
| | Image-side surface 42 | -13.728 | 0.307 | | | |
| Fifth lens element 5 | Object-side surface 51 | -12.298 | 0.572 | 1.661 | 20.373 | -17.277 |
| | Image-side surface 52 | 187.115 | 0.106 | | | |
| Sixth lens element 6 | Object-side surface 61 | 15.577 | 0.607 | 1.544 | 49.922 | 45.051 |
| | Image-side surface 62 | 41.832 | 0.065 | | | |
| Seventh lens element 7 | Object-side surface 71 | 2.712 | 0.526 | 1.516 | 57.062 | 9.132 |
| | Image-side surface 72 | 5.938 | 1.211 | | | |
| Eighth lens element 8 | Object-side surface 81 | -70.508 | 0.795 | 1.545 | 55.987 | -5.813 |
| | Image-side surface 82 | 3.339 | 0.272 | | | |
| Filter F | Object-side surface F1 | Infinity | 0.210 | 1.560 | 51.300 | |
| | Image-side surface F2 | Infinity | 0.438 | | | |
| | Image plane 99 | Infinity | | | | |

FIG. 12

| Surface | K | $a_4$ | $a_6$ | $a_8$ | $a_{10}$ |
|---|---|---|---|---|---|
| 11 | 3.008833E-01 | -1.178819E-03 | 2.118126E-04 | -2.448469E-04 | 1.180736E-04 |
| 12 | 0.000000E+00 | -2.055549E-02 | 1.245568E-02 | -4.851990E-03 | 1.272314E-03 |
| 21 | 6.700322E+00 | -2.930902E-02 | 1.468787E-02 | -5.042862E-03 | 1.154606E-03 |
| 22 | -6.241190E-01 | -1.006500E-02 | 5.053652E-03 | 1.018903E-05 | -7.527648E-04 |
| 31 | 0.000000E+00 | -1.979961E-02 | 5.397810E-04 | -1.270062E-03 | 6.552464E-04 |
| 32 | -9.964170E+00 | -1.089490E-02 | -6.674404E-03 | 1.979708E-03 | -2.191992E-04 |
| 41 | 2.585672E-02 | 2.856122E-03 | -9.139232E-03 | 2.257225E-03 | 2.762990E-04 |
| 42 | -6.871913E-01 | 4.457807E-03 | -1.474422E-02 | 6.142443E-03 | -1.667792E-03 |
| 51 | 1.033155E+01 | 3.507391E-03 | -1.389794E-02 | 6.727023E-03 | -2.208680E-03 |
| 52 | -2.991413E-01 | -1.460981E-02 | -4.078664E-03 | 3.002785E-03 | -9.972783E-04 |
| 61 | -1.668386E+00 | 1.317036E-03 | -1.659325E-03 | 8.323984E-04 | -3.940567E-04 |
| 62 | -2.789667E-03 | -2.993741E-02 | 1.548691E-02 | -4.187586E-03 | 5.962068E-04 |
| 71 | -4.598776E+00 | -7.934486E-03 | 8.431138E-04 | -1.920956E-03 | 8.044296E-04 |
| 72 | 2.997676E-02 | 2.388245E-02 | -1.668253E-02 | 4.186298E-03 | -6.796081E-04 |
| 81 | 5.715853E+00 | -4.475916E-02 | 1.071216E-02 | -2.228705E-03 | 3.164405E-04 |
| 82 | -1.098412E+01 | -1.947228E-02 | 4.440830E-03 | -7.543626E-04 | 8.494352E-05 |
| Surface | $a_{12}$ | $a_{14}$ | $a_{16}$ | $a_{18}$ | $a_{20}$ |
| 11 | -3.402724E-05 | 4.993576E-06 | -3.212044E-07 | | |
| 12 | -2.146194E-04 | 2.064377E-05 | -8.564436E-07 | | |
| 21 | -1.666153E-04 | 1.344454E-05 | -3.887324E-07 | | |
| 22 | 3.452872E-04 | -6.861640E-05 | 5.579241E-06 | | |
| 31 | -2.933348E-04 | 6.381488E-05 | -4.662539E-06 | | |
| 32 | -6.925458E-07 | 2.298786E-06 | 1.219680E-07 | | |
| 41 | -1.750824E-04 | 2.481312E-05 | -1.193869E-06 | | |
| 42 | 3.340057E-04 | -4.002407E-05 | 2.008231E-06 | | |
| 51 | 6.343939E-04 | -1.292737E-04 | 1.587102E-05 | -1.046094E-06 | 2.812824E-08 |
| 52 | 2.484079E-04 | -4.144139E-05 | 4.166680E-06 | -2.289376E-07 | 5.300826E-09 |
| 61 | 8.791052E-05 | -1.044570E-05 | 6.839257E-07 | -2.327551E-08 | 2.889330E-10 |
| 62 | -5.092121E-05 | 2.823465E-06 | -1.026487E-07 | 2.231525E-09 | -2.232200E-11 |
| 71 | -1.781149E-04 | 2.316590E-05 | -1.784444E-06 | 7.551350E-08 | -1.344238E-09 |
| 72 | 7.373207E-05 | -5.276315E-06 | 2.385066E-07 | -6.159080E-09 | 6.940700E-11 |
| 81 | -2.765844E-05 | 1.492078E-06 | -4.892617E-08 | 9.002320E-10 | -7.168000E-12 |
| 82 | -6.347409E-06 | 3.097958E-07 | -9.477044E-09 | 1.648720E-10 | -1.243000E-12 |

FIG. 13

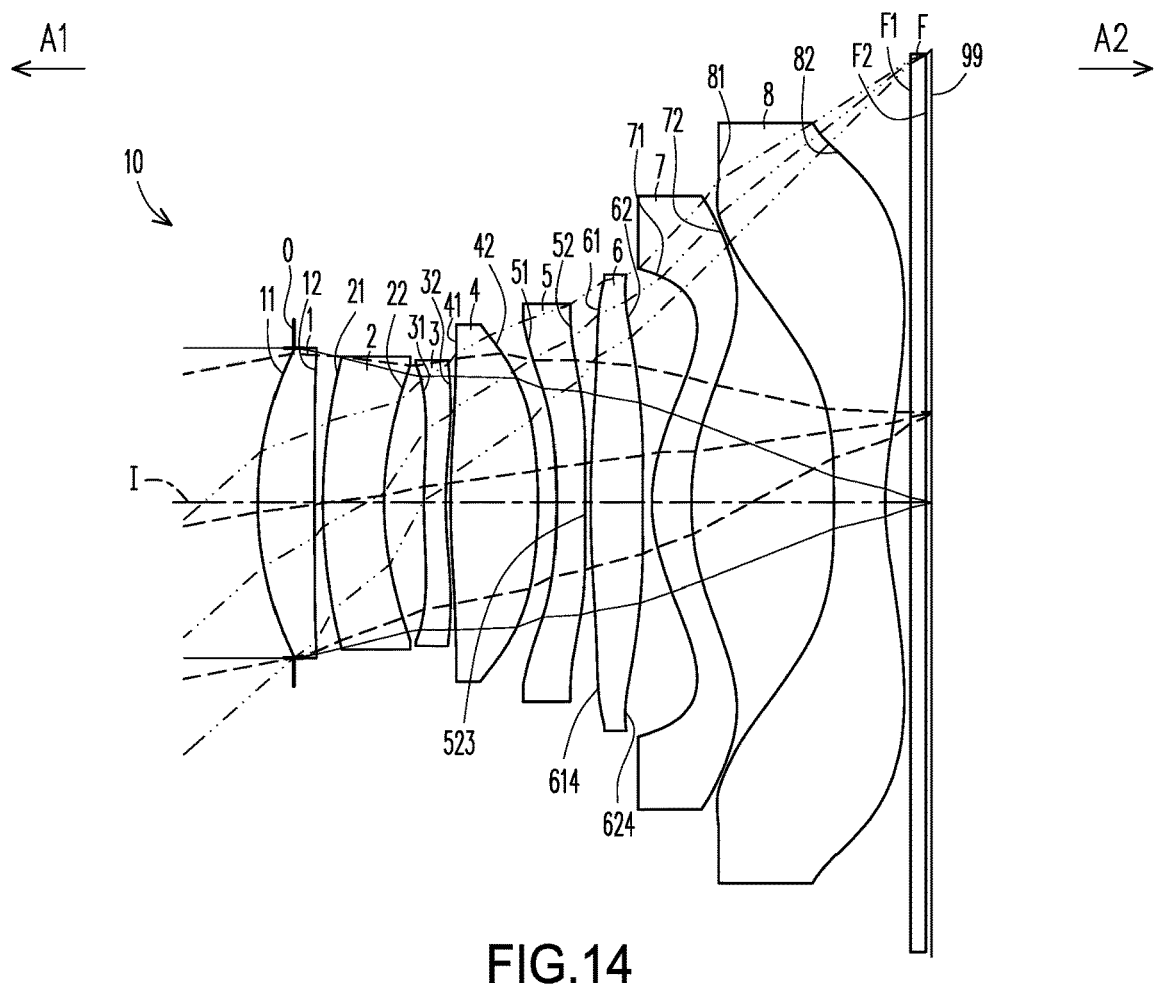
FIG.14
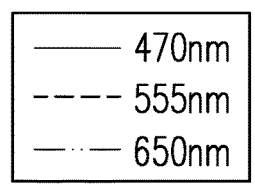
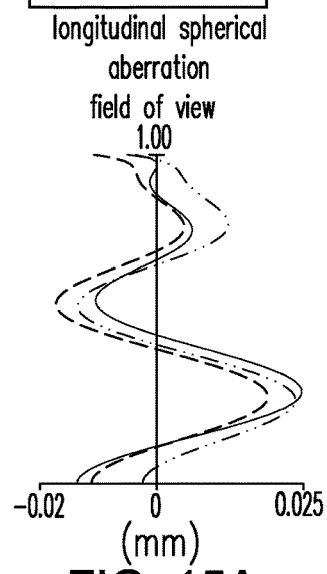
FIG. 15A
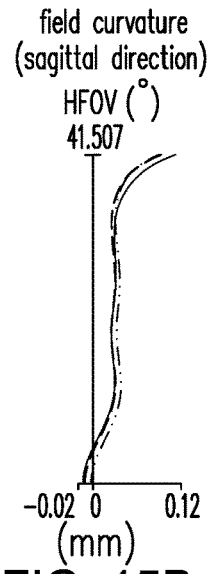
FIG. 15B
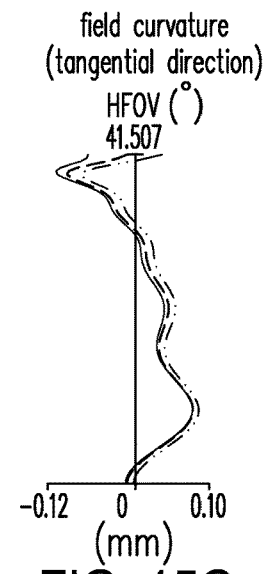
FIG. 15C
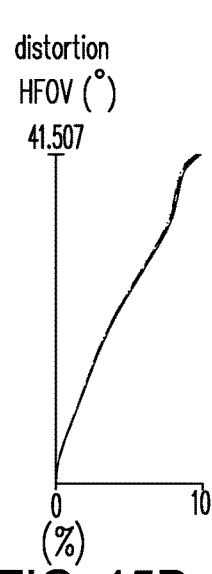
FIG. 15D

| Third embodiment ||||||
|---|---|---|---|---|---|
| EFL=6.370 mm, HFOV=41.507°, TTL=9.217 mm, Fno=1.500, ImgH=6.200 mm 。 ||||||
| Device | Surface | Radius of curvature (mm) | Thickness (mm) | Refractive index | Abbe number | Focal length (mm) |
| Object | | Infinity | Infinity | | | |
| Aperture 0 | | Infinity | -0.488 | | | |
| First lens element 1 | Object-side surface 11 | 4.640 | 0.769 | 1.545 | 55.987 | 9.500 |
| | Image-side surface 12 | 41.241 | 0.116 | | | |
| Second lens element 2 | Object-side surface 21 | 6.446 | 0.839 | 1.671 | 19.243 | -22.430 |
| | Image-side surface 22 | 4.288 | 0.548 | | | |
| Third lens element 3 | Object-side surface 31 | 9.039 | 0.299 | 1.681 | 18.154 | -29.958 |
| | Image-side surface 32 | 6.198 | 0.068 | | | |
| Fourth lens element 4 | Object-side surface 41 | 12.916 | 1.198 | 1.567 | 37.533 | 8.019 |
| | Image-side surface 42 | -6.832 | 0.253 | | | |
| Fifth lens element 5 | Object-side surface 51 | -9.200 | 0.384 | 1.671 | 19.243 | -11.131 |
| | Image-side surface 52 | 42.549 | 0.075 | | | |
| Sixth lens element 6 | Object-side surface 61 | 13.899 | 0.713 | 1.545 | 55.987 | 69.915 |
| | Image-side surface 62 | 21.455 | 0.129 | | | |
| Seventh lens element 7 | Object-side surface 71 | 2.301 | 0.541 | 1.567 | 37.533 | 7.453 |
| | Image-side surface 72 | 4.593 | 1.955 | | | |
| Eighth lens element 8 | Object-side surface 81 | -41.208 | 0.694 | 1.545 | 55.987 | -6.359 |
| | Image-side surface 82 | 3.816 | 0.350 | | | |
| Filter F | Object-side surface F1 | Infinity | 0.210 | 1.560 | 51.300 | |
| | Image-side surface F2 | Infinity | 0.076 | | | |
| | Image plane 99 | Infinity | | | | |

FIG. 16

| Surface | K | $a_4$ | $a_6$ | $a_8$ | $a_{10}$ |
|---|---|---|---|---|---|
| 11 | 3.008833E-01 | -2.135747E-03 | 1.254918E-03 | -8.988791E-04 | 3.616096E-04 |
| 12 | 0.000000E+00 | -1.572866E-02 | 1.195583E-02 | -4.967898E-03 | 1.301881E-03 |
| 21 | 6.700322E+00 | -2.158816E-02 | 1.228399E-02 | -5.408707E-03 | 1.400750E-03 |
| 22 | -6.241190E-01 | -1.016521E-02 | 2.353597E-03 | 7.046428E-04 | -8.987625E-04 |
| 31 | 0.000000E+00 | -3.164226E-02 | 5.420713E-03 | -2.767736E-03 | 1.430359E-03 |
| 32 | -9.964170E+00 | -1.810062E-02 | -4.227993E-03 | 2.195819E-03 | -2.425524E-04 |
| 41 | 2.585672E-02 | 4.555152E-03 | -8.723269E-03 | 1.933048E-03 | 2.727498E-04 |
| 42 | -6.871913E-01 | 6.330019E-03 | -1.393942E-02 | 5.777138E-03 | -1.681723E-03 |
| 51 | 1.033155E+01 | 4.939832E-03 | -1.442260E-02 | 6.886392E-03 | -2.215222E-03 |
| 52 | -2.991413E-01 | -1.546931E-02 | -3.719109E-03 | 2.959076E-03 | -9.956878E-04 |
| 61 | -1.668386E+00 | -3.789864E-03 | -8.658472E-04 | 9.175392E-04 | -3.941332E-04 |
| 62 | -2.789667E-03 | -4.417922E-02 | 1.791881E-02 | -4.232073E-03 | 5.939674E-04 |
| 71 | -4.598776E+00 | 5.300501E-03 | -3.259870E-04 | -1.874900E-03 | 8.106186E-04 |
| 72 | 2.997676E-02 | 3.098618E-02 | -1.703793E-02 | 4.180770E-03 | -6.791314E-04 |
| 81 | 5.715853E+00 | -4.267804E-02 | 1.060183E-02 | -2.228628E-03 | 3.164537E-04 |
| 82 | -1.098412E+01 | -1.750505E-02 | 4.398187E-03 | -7.551941E-04 | 8.492777E-05 |
| Surface | $a_{12}$ | $a_{14}$ | $a_{16}$ | $a_{18}$ | $a_{20}$ |
| 11 | -8.175990E-05 | 1.005103E-05 | -5.236912E-07 | | |
| 12 | -2.113437E-04 | 1.969197E-05 | -8.263524E-07 | | |
| 21 | -2.143266E-04 | 1.692300E-05 | -6.315014E-07 | | |
| 22 | 3.249460E-04 | -5.398524E-05 | 3.575327E-06 | | |
| 31 | -5.018790E-04 | 9.622645E-05 | -7.611417E-06 | | |
| 32 | -5.072131E-06 | 1.517172E-06 | -3.804369E-08 | | |
| 41 | -1.709242E-04 | 2.516584E-05 | -1.236146E-06 | | |
| 42 | 3.381895E-04 | -3.929472E-05 | 1.933726E-06 | | |
| 51 | 6.340562E-04 | -1.292719E-04 | 1.587421E-05 | -1.045696E-06 | 2.850689E-08 |
| 52 | 2.483713E-04 | -4.144145E-05 | 4.164036E-06 | -2.287277E-07 | 5.355868E-09 |
| 61 | 8.744631E-05 | -1.049727E-05 | 6.870041E-07 | -2.275861E-08 | 2.941280E-10 |
| 62 | -5.108956E-05 | 2.832347E-06 | -1.022588E-07 | 2.173238E-09 | -2.103400E-11 |
| 71 | -1.785185E-04 | 2.308179E-05 | -1.777860E-06 | 7.592182E-08 | -1.414803E-09 |
| 72 | 7.374466E-05 | -5.275340E-06 | 2.384504E-07 | -6.162225E-09 | 6.917600E-11 |
| 81 | -2.765673E-05 | 1.492097E-06 | -4.892703E-08 | 9.002560E-10 | -7.168000E-12 |
| 82 | -6.343111E-06 | 3.097483E-07 | -9.482985E-09 | 1.647720E-10 | -1.235000E-12 |

FIG. 17

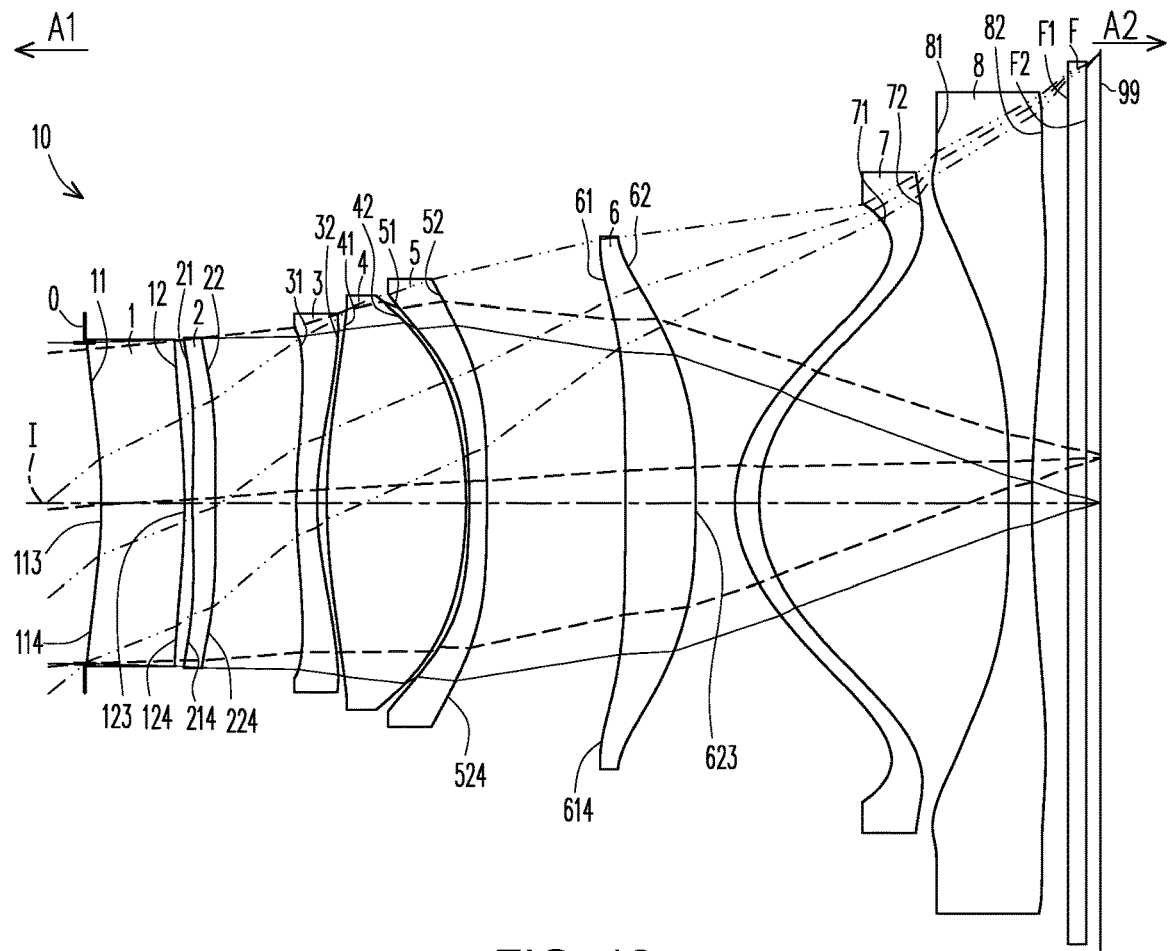
FIG. 18
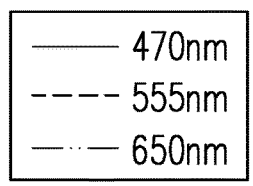
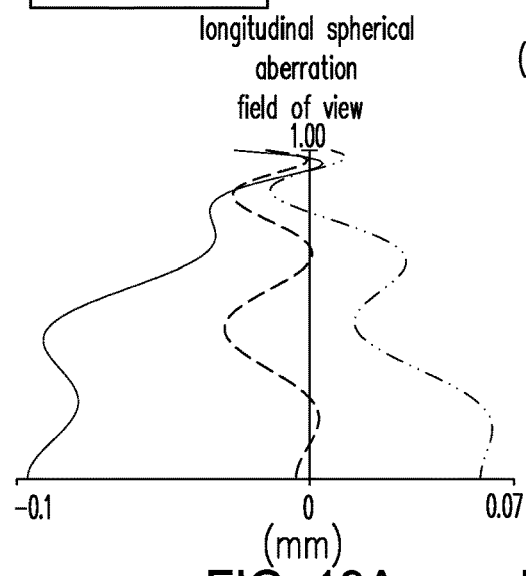
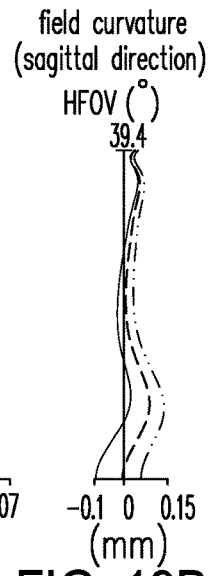
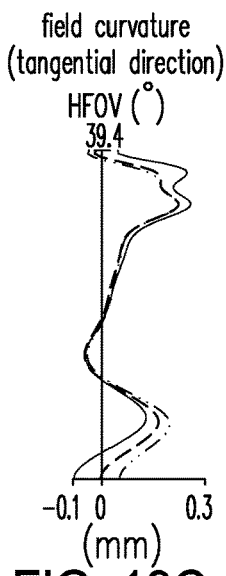
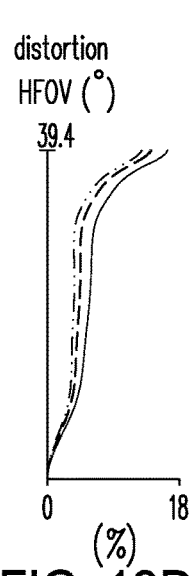
FIG. 19A    FIG. 19B    FIG. 19C    FIG. 19D

| Fourth embodiment | | | | | | |
|---|---|---|---|---|---|---|
| EFL=6.609 mm, HFOV=39.400°, TTL=13.711 mm, Fno=1.500, ImgH=6.200 mm。 | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | 0.228 | | | |
| First lens element 1 | Object-side surface 11 | -7.018 | 1.144 | 1.545 | 55.987 | -60.117 |
| | Image-side surface 12 | -9.439 | 0.111 | | | |
| Second lens element 2 | Object-side surface 21 | 16.746 | 0.315 | 1.671 | 19.243 | 31.828 |
| | Image-side surface 22 | 74.378 | 1.103 | | | |
| Third lens element 3 | Object-side surface 31 | 7.411 | 0.285 | 1.681 | 18.154 | -15.029 |
| | Image-side surface 32 | 4.248 | 0.135 | | | |
| Fourth lens element 4 | Object-side surface 41 | 8.868 | 1.914 | 1.567 | 37.490 | 6.190 |
| | Image-side surface 42 | -5.400 | 0.043 | | | |
| Fifth lens element 5 | Object-side surface 51 | -10.733 | 0.242 | 1.671 | 19.243 | -20.194 |
| | Image-side surface 52 | -50.235 | 1.895 | | | |
| Sixth lens element 6 | Object-side surface 61 | 34488.688 | 0.966 | 1.545 | 55.987 | 68.915 |
| | Image-side surface 62 | -37.687 | 0.541 | | | |
| Seventh lens element 7 | Object-side surface 71 | 1.829 | 0.334 | 1.671 | 19.243 | 11.027 |
| | Image-side surface 72 | 2.244 | 3.420 | | | |
| Eighth lens element 8 | Object-side surface 81 | -1359.807 | 0.320 | 1.545 | 55.987 | -21.920 |
| | Image-side surface 82 | 12.082 | 0.500 | | | |
| Filter F | Object-side surface F1 | Infinity | 0.249 | 1.560 | 51.300 | |
| | Image-side surface F2 | Infinity | 0.194 | | | |
| | Image plane 99 | Infinity | | | | |

FIG. 20

| Surface | K | $a_4$ | $a_6$ | $a_8$ | $a_{10}$ |
|---|---|---|---|---|---|
| 11 | -2.393977E+01 | 1.554544E-03 | 5.423134E-04 | -2.581966E-04 | 7.583580E-05 |
| 12 | 0.000000E+00 | 3.606245E-03 | 3.233544E-03 | -1.473318E-03 | 3.029254E-04 |
| 21 | 1.239892E+01 | -2.333773E-02 | 5.486982E-03 | -1.588830E-03 | 3.099380E-04 |
| 22 | 9.511472E+01 | -1.872799E-02 | 2.214639E-03 | 1.829686E-04 | -1.919837E-04 |
| 31 | 0.000000E+00 | -1.850743E-02 | 2.926719E-03 | -8.458524E-04 | 3.104069E-04 |
| 32 | -7.242875E+00 | -5.746552E-03 | -1.945336E-03 | 6.441885E-04 | -5.616875E-05 |
| 41 | 4.319179E+00 | 2.614513E-03 | -3.631437E-03 | 5.715396E-04 | 5.750180E-05 |
| 42 | -2.014352E+00 | 3.552089E-03 | -6.143744E-03 | 1.768442E-03 | -3.662523E-04 |
| 51 | 9.529958E+00 | -5.574624E-03 | -6.467097E-03 | 2.096459E-03 | -4.793208E-04 |
| 52 | -1.019210E+02 | -1.262656E-02 | -1.665752E-03 | 9.072868E-04 | -2.162529E-04 |
| 61 | 8.996748E+01 | -4.087881E-03 | -3.201264E-04 | 2.775035E-04 | -8.562349E-05 |
| 62 | 7.480475E+01 | -3.149710E-02 | 7.770034E-03 | -1.275532E-03 | 1.291881E-04 |
| 71 | -2.073280E+00 | 1.643042E-02 | -1.164389E-03 | -5.435801E-04 | 1.764904E-04 |
| 72 | -7.968994E-01 | 2.008214E-02 | -7.577191E-03 | 1.264241E-03 | -1.474372E-04 |
| 81 | 0.000000E+00 | -1.978823E-02 | 4.300143E-03 | -6.816578E-04 | 6.878596E-05 |
| 82 | -3.650133E+00 | -6.952357E-03 | 1.548751E-03 | -2.207239E-04 | 1.855408E-05 |
| Surface | $a_{12}$ | $a_{14}$ | $a_{16}$ | $a_{18}$ | $a_{20}$ |
| 11 | -1.313799E-05 | 1.118164E-06 | -3.346569E-08 | | |
| 12 | -3.303372E-05 | 1.714572E-06 | -1.559501E-08 | | |
| 21 | -3.023632E-05 | 2.345158E-06 | -1.642601E-07 | | |
| 22 | 5.315831E-05 | -5.553239E-06 | 1.616554E-07 | | |
| 31 | -7.831638E-05 | 1.044407E-05 | -6.114003E-07 | | |
| 32 | -9.120826E-07 | 1.971834E-07 | -3.399064E-09 | | |
| 41 | -2.666408E-05 | 2.750581E-06 | -9.333239E-08 | | |
| 42 | 5.197192E-05 | -4.334694E-06 | 1.558343E-07 | | |
| 51 | 9.819049E-05 | -1.421594E-05 | 1.244544E-06 | -5.838515E-08 | 1.136886E-09 |
| 52 | 3.833881E-05 | -4.565202E-06 | 3.264833E-07 | -1.273847E-08 | 2.168520E-10 |
| 61 | 1.353085E-05 | -1.155032E-06 | 5.388494E-08 | -1.270535E-09 | 1.158100E-11 |
| 62 | -7.924562E-06 | 3.094363E-07 | -8.059454E-09 | 1.251850E-10 | -3.030000E-13 |
| 71 | -2.758077E-05 | 2.540407E-06 | -1.396127E-07 | 4.224684E-09 | -5.402000E-11 |
| 72 | 1.141463E-05 | -5.801567E-07 | 1.869724E-08 | -3.442730E-10 | 2.710000E-12 |
| 81 | -4.269718E-06 | 1.642640E-07 | -3.839591E-09 | 5.013500E-11 | -2.810000E-13 |
| 82 | -9.846938E-07 | 3.397741E-08 | -7.417660E-10 | 9.280000E-12 | -5.100000E-14 |

FIG. 21

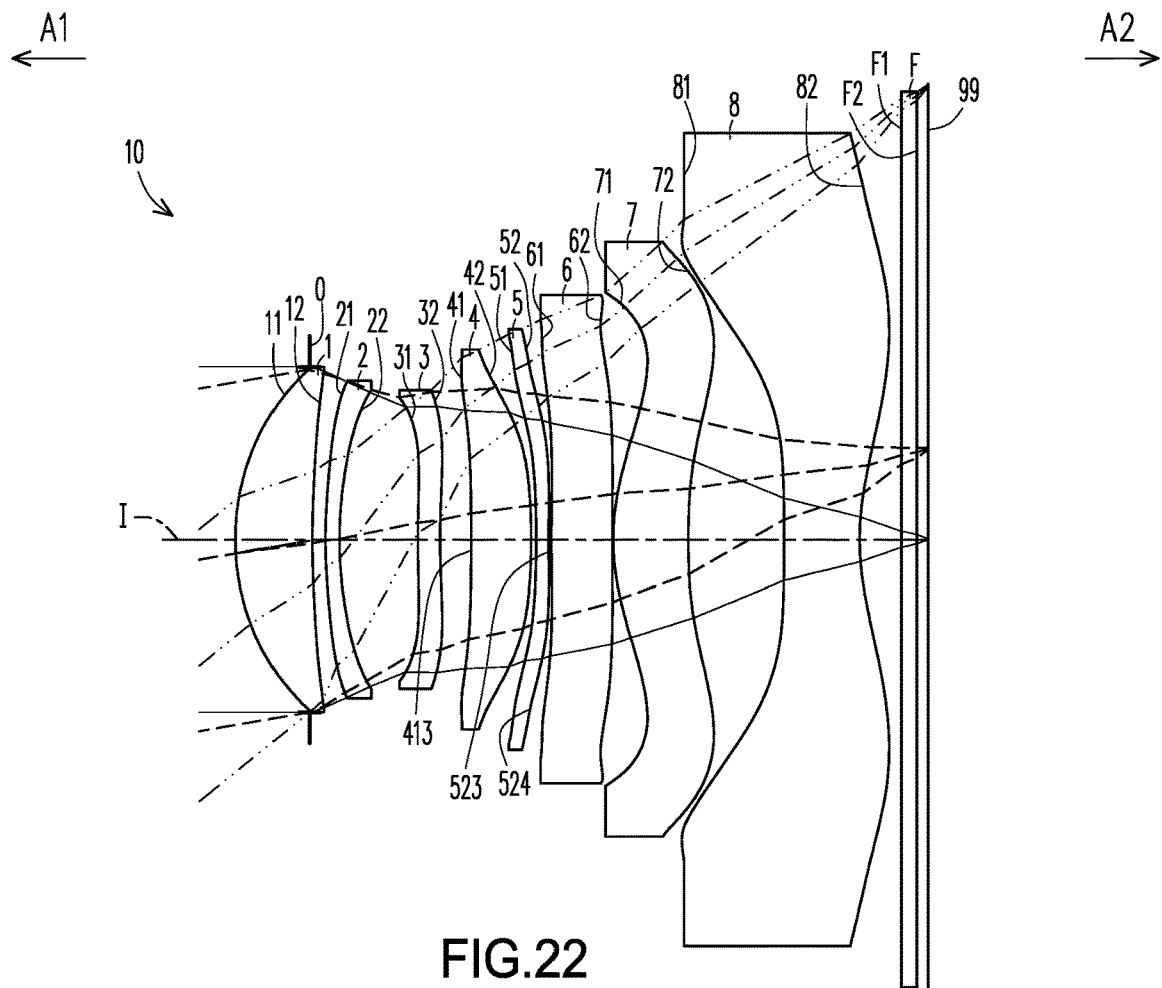
FIG.22
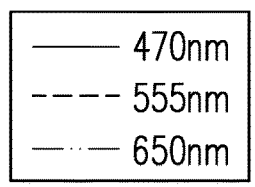
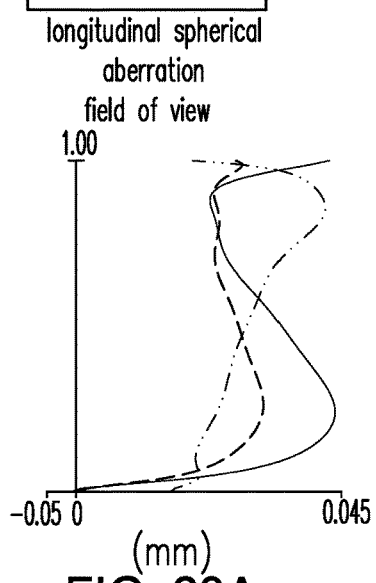
longitudinal spherical aberration
field of view
FIG. 23A
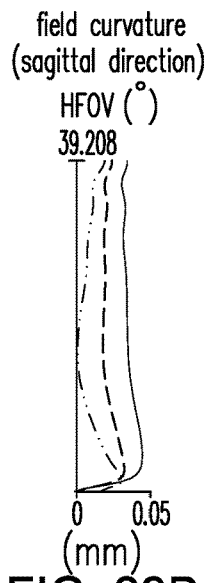
field curvature (sagittal direction)
HFOV (°)
FIG. 23B
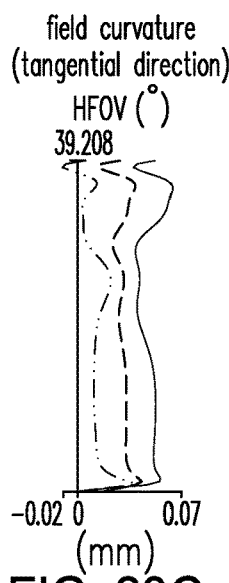
field curvature (tangential direction)
HFOV (°)
FIG. 23C
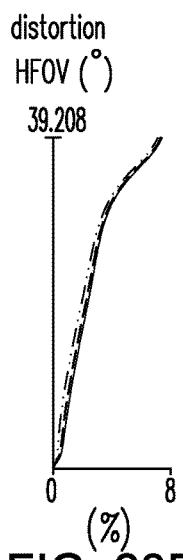
distortion
HFOV (°)
FIG. 23D

| Fifth embodiment | | | | | | |
|---|---|---|---|---|---|---|
| EFL=7.081 mm, HFOV=39.208°, TTL=9.456 mm, Fno=1.500, ImgH=6.200 mm。 | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -1.008 | | | |
| First lens element 1 | Object-side surface 11 | 3.336 | 1.046 | 1.545 | 55.987 | 7.878 |
| | Image-side surface 12 | 13.184 | 0.179 | | | |
| Second lens element 2 | Object-side surface 21 | 6.649 | 0.192 | 1.671 | 19.243 | -30.040 |
| | Image-side surface 22 | 4.953 | 1.072 | | | |
| Third lens element 3 | Object-side surface 31 | 14.980 | 0.305 | 1.671 | 19.243 | -65.600 |
| | Image-side surface 32 | 11.112 | 0.425 | | | |
| Fourth lens element 4 | Object-side surface 41 | -81.093 | 0.822 | 1.545 | 55.987 | 18.533 |
| | Image-side surface 42 | -9.033 | 0.069 | | | |
| Fifth lens element 5 | Object-side surface 51 | -13.581 | 0.170 | 1.671 | 19.243 | -7.946 |
| | Image-side surface 52 | 8.965 | 0.037 | | | |
| Sixth lens element 6 | Object-side surface 61 | 7.023 | 0.826 | 1.545 | 55.987 | 16.754 |
| | Image-side surface 62 | 28.938 | 0.013 | | | |
| Seventh lens element 7 | Object-side surface 71 | 3.181 | 1.027 | 1.567 | 37.490 | 7.570 |
| | Image-side surface 72 | 10.688 | 1.310 | | | |
| Eighth lens element 8 | Object-side surface 81 | -999.923 | 1.028 | 1.545 | 55.987 | -6.647 |
| | Image-side surface 82 | 3.646 | 0.572 | | | |
| Filter F | Object-side surface F1 | Infinity | 0.210 | 1.560 | 51.300 | |
| | Image-side surface F2 | Infinity | 0.154 | | | |
| | Image plane 99 | Infinity | | | | |

FIG. 24

| Surface | K | $a_4$ | $a_6$ | $a_8$ | $a_{10}$ |
|---|---|---|---|---|---|
| 11 | 3.554140E-01 | -4.197333E-04 | 3.467860E-04 | -3.785771E-04 | 1.889338E-04 |
| 12 | 0.000000E+00 | -9.759936E-03 | 4.763295E-03 | -1.459182E-03 | 3.263779E-04 |
| 21 | 6.694529E+00 | -3.315246E-02 | 1.434588E-02 | -3.854026E-03 | 6.800984E-04 |
| 22 | -2.344779E+00 | -1.999055E-02 | 1.220414E-02 | -3.397857E-03 | 7.996543E-04 |
| 31 | 0.000000E+00 | -2.062605E-02 | -1.799012E-03 | 6.134755E-04 | -3.370579E-04 |
| 32 | 5.800564E+00 | -1.767774E-02 | -1.408015E-03 | 8.143099E-04 | -3.569291E-04 |
| 41 | 9.172365E+02 | -7.843791E-03 | 1.868707E-03 | -1.212006E-03 | 4.051857E-04 |
| 42 | 2.877021E+00 | 4.041668E-03 | -1.963220E-02 | 7.968544E-03 | -1.556109E-03 |
| 51 | 6.073062E+00 | 2.071209E-02 | -3.493225E-02 | 1.833930E-02 | -5.461304E-03 |
| 52 | -2.451884E+04 | 5.729787E-03 | -3.255198E-02 | 2.121560E-02 | -7.635955E-03 |
| 61 | -1.546595E+04 | 8.721803E-03 | -1.702287E-02 | 9.889715E-03 | -3.350811E-03 |
| 62 | 0.000000E+00 | -1.532140E-02 | 4.856010E-03 | -1.223448E-03 | 2.162619E-04 |
| 71 | -3.749402E+00 | -2.611563E-03 | -2.336293E-03 | 1.065966E-03 | -3.635370E-04 |
| 72 | 5.144002E+00 | 2.302447E-02 | -8.634597E-03 | 1.604034E-03 | -2.174119E-04 |
| 81 | 0.000000E+00 | -1.564430E-02 | -7.349411E-06 | 2.567520E-04 | -4.481483E-05 |
| 82 | -2.644678E+00 | -1.542230E-02 | 1.570297E-03 | -9.788084E-05 | 1.166050E-06 |
| Surface | $a_{12}$ | $a_{14}$ | $a_{16}$ | $a_{18}$ | $a_{20}$ |
| 11 | -5.222915E-05 | 7.604748E-06 | -4.746470E-07 | | |
| 12 | -4.953053E-05 | 4.231108E-06 | -1.512745E-07 | | |
| 21 | -8.877876E-05 | 7.988175E-06 | -3.343212E-07 | | |
| 22 | -1.703000E-04 | 2.560186E-05 | -1.657754E-06 | | |
| 31 | 8.750652E-05 | -1.432323E-05 | 1.221722E-06 | | |
| 32 | 1.012428E-04 | -1.525203E-05 | 1.065317E-06 | | |
| 41 | -5.992050E-05 | 4.714261E-06 | -1.782412E-07 | | |
| 42 | 1.578227E-04 | -6.155011E-06 | -4.478712E-08 | | |
| 51 | 1.083511E-03 | -1.486401E-04 | 1.369810E-05 | -7.643758E-07 | 1.937348E-08 |
| 52 | 1.743858E-03 | -2.571446E-04 | 2.385534E-05 | -1.275292E-06 | 3.009379E-08 |
| 61 | 7.017819E-04 | -9.091893E-05 | 7.116827E-06 | -3.101734E-07 | 5.801021E-09 |
| 62 | -3.019058E-05 | 3.206012E-06 | -2.092139E-07 | 6.769850E-09 | -7.621800E-11 |
| 71 | 7.875292E-05 | -1.083014E-05 | 9.099580E-07 | -4.246065E-08 | 8.399490E-10 |
| 72 | 2.158839E-05 | -1.543067E-06 | 7.497599E-08 | -2.194989E-09 | 2.889900E-11 |
| 81 | 4.572108E-06 | -2.832101E-07 | 1.034691E-08 | -2.058230E-10 | 1.727000E-12 |
| 82 | 2.627757E-07 | -1.820892E-08 | 5.353720E-10 | -7.635000E-12 | 4.300000E-14 |

FIG. 25

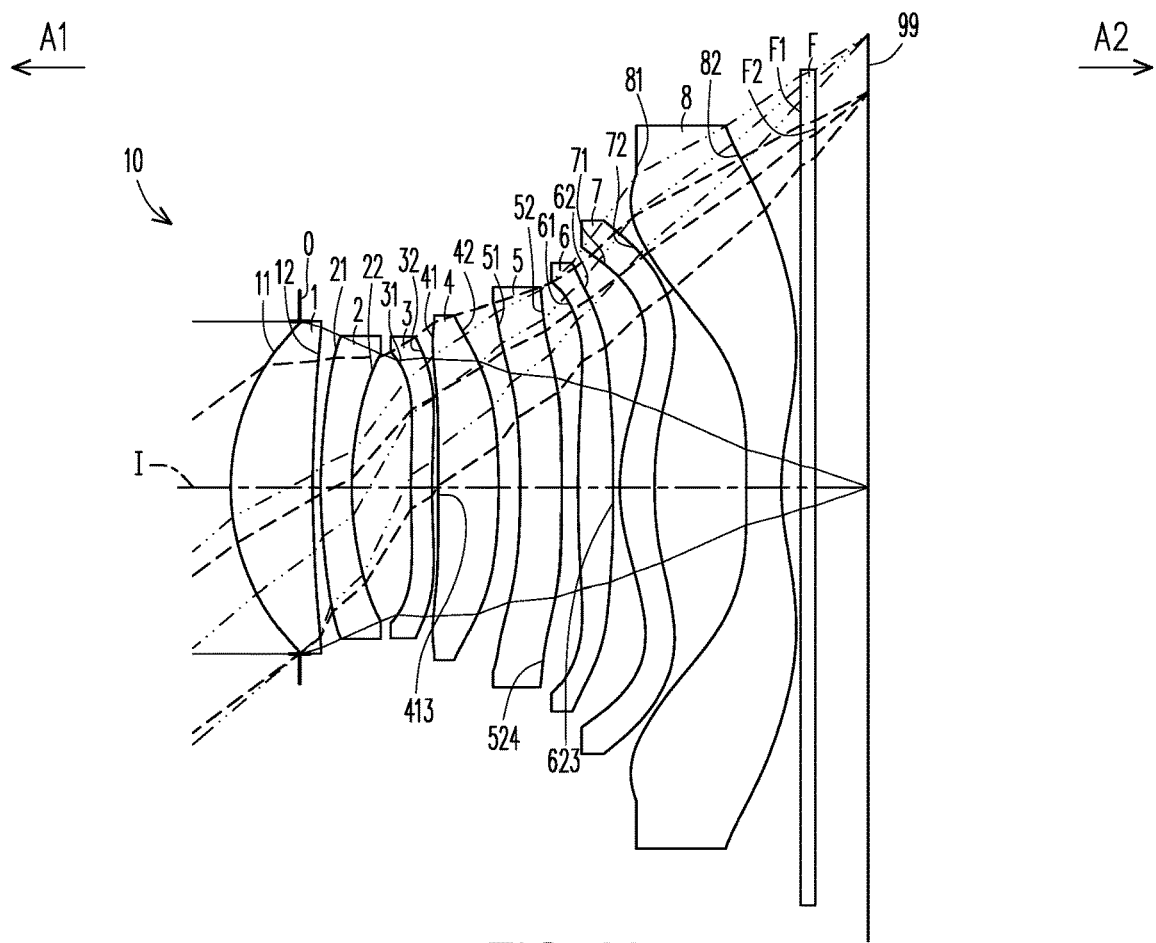
FIG. 26
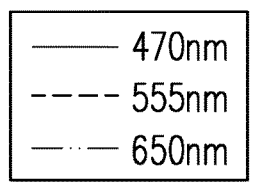
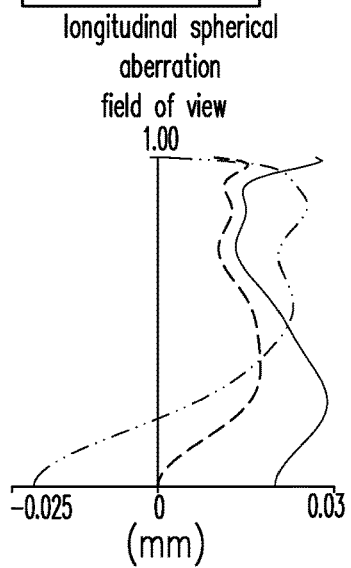
FIG. 27A
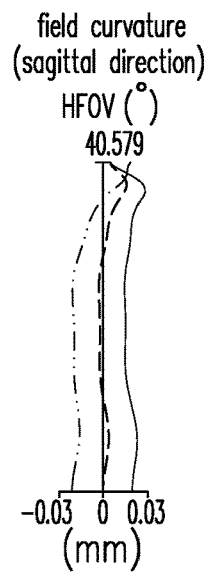
FIG. 27B
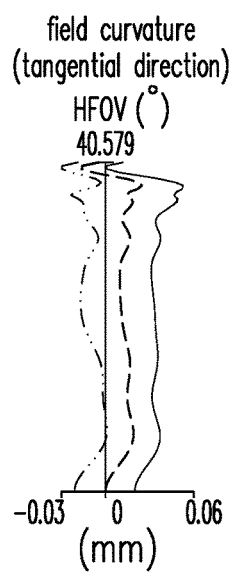
FIG. 27C
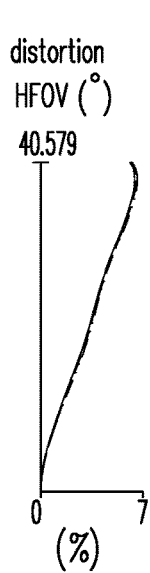
FIG. 27D

| Sixth embodiment | | | | | | |
|---|---|---|---|---|---|---|
| EFL=7.038 mm, HFOV=40.579°, TTL=8.988 mm, Fno=1.500, ImgH=6.400 mm。 | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -0.967 | | | |
| First lens element 1 | Object-side surface 11 | 3.293 | 1.149 | 1.545 | 55.987 | 7.815 |
| | Image-side surface 12 | 12.618 | 0.113 | | | |
| Second lens element 2 | Object-side surface 21 | 6.549 | 0.440 | 1.671 | 19.243 | -24.162 |
| | Image-side surface 22 | 4.551 | 0.837 | | | |
| Third lens element 3 | Object-side surface 31 | 13.457 | 0.299 | 1.671 | 19.243 | -93.598 |
| | Image-side surface 32 | 11.002 | 0.087 | | | |
| Fourth lens element 4 | Object-side surface 41 | -337.904 | 0.854 | 1.545 | 55.987 | 17.411 |
| | Image-side surface 42 | -9.259 | 0.306 | | | |
| Fifth lens element 5 | Object-side surface 51 | -13.405 | 0.577 | 1.671 | 19.243 | -20.127 |
| | Image-side surface 52 | -801.523 | 0.233 | | | |
| Sixth lens element 6 | Object-side surface 61 | 25.795 | 0.497 | 1.545 | 55.987 | 46.965 |
| | Image-side surface 62 | -4736.135 | 0.094 | | | |
| Seventh lens element 7 | Object-side surface 71 | 2.896 | 0.490 | 1.567 | 37.490 | 8.634 |
| | Image-side surface 72 | 6.603 | 1.301 | | | |
| Eighth lens element 8 | Object-side surface 81 | -76.618 | 0.492 | 1.545 | 55.987 | -5.854 |
| | Image-side surface 82 | 3.345 | 0.272 | | | |
| Filter F | Object-side surface F1 | Infinity | 0.210 | 1.560 | 51.300 | |
| | Image-side surface F2 | Infinity | 0.737 | | | |
| | Image plane 99 | Infinity | | | | |

FIG. 28

| Surface | K | $a_4$ | $a_6$ | $a_8$ | $a_{10}$ |
|---|---|---|---|---|---|
| 11 | 3.053571E-01 | -9.839817E-04 | 3.763959E-04 | -4.068603E-04 | 1.979147E-04 |
| 12 | 0.000000E+00 | -1.921386E-02 | 1.143297E-02 | -4.217314E-03 | 1.042453E-03 |
| 21 | 6.658680E+00 | -2.988166E-02 | 1.383486E-02 | -4.604691E-03 | 1.017642E-03 |
| 22 | -7.717227E-01 | -1.059095E-02 | 5.779629E-03 | -9.388043E-04 | -8.115363E-05 |
| 31 | 0.000000E+00 | -2.280239E-02 | -2.144159E-03 | 1.372457E-03 | -8.030107E-04 |
| 32 | -7.731988E+00 | -1.456880E-02 | -8.215176E-03 | 3.361169E-03 | -7.576817E-04 |
| 41 | 9.193080E+05 | 2.937133E-03 | -8.877437E-03 | 1.428756E-03 | 7.257888E-04 |
| 42 | 1.919700E+00 | -1.605463E-03 | -7.128586E-03 | 1.641853E-03 | -2.177475E-04 |
| 51 | 1.267359E+01 | -2.783933E-03 | -6.314040E-03 | 3.374665E-03 | -1.583463E-03 |
| 52 | -4.895466E+05 | -1.259185E-02 | -2.941662E-03 | 1.869352E-03 | -7.008196E-04 |
| 61 | -9.611955E+00 | 4.063589E-03 | -4.336372E-04 | -5.775928E-04 | 2.373944E-04 |
| 62 | 1.858033E+06 | -3.698364E-02 | 1.890759E-02 | -3.868007E-03 | 7.612537E-05 |
| 71 | -5.014591E+00 | 2.999895E-03 | -7.251495E-03 | 1.151663E-03 | 2.411634E-04 |
| 72 | -1.253074E-01 | 4.405826E-02 | -3.047141E-02 | 9.192650E-03 | -1.733864E-03 |
| 81 | 3.491579E-01 | -3.835148E-02 | 6.644220E-03 | -1.379611E-03 | 2.328060E-04 |
| 82 | -7.991735E+00 | -2.172773E-02 | 3.691100E-03 | -5.438355E-04 | 5.929548E-05 |
| Surface | $a_{12}$ | $a_{14}$ | $a_{16}$ | $a_{18}$ | $a_{20}$ |
| 11 | -5.529378E-05 | 8.089431E-06 | -5.130857E-07 | | |
| 12 | -1.667471E-04 | 1.521953E-05 | -6.039801E-07 | | |
| 21 | -1.495430E-04 | 1.277655E-05 | -4.500927E-07 | | |
| 22 | 8.893509E-05 | -1.949620E-05 | 1.680362E-06 | | |
| 31 | 1.506433E-04 | -1.460714E-05 | 1.232210E-06 | | |
| 32 | 1.100569E-04 | -1.122662E-05 | 8.562376E-07 | | |
| 41 | -2.796905E-04 | 3.662898E-05 | -1.730044E-06 | | |
| 42 | 5.402902E-05 | -9.326399E-06 | 5.725228E-07 | | |
| 51 | 6.597365E-04 | -1.654879E-04 | 2.312352E-05 | -1.688878E-06 | 5.039479E-08 |
| 52 | 2.366887E-04 | -5.008786E-05 | 5.966108E-06 | -3.729122E-07 | 9.571241E-09 |
| 61 | -1.013535E-04 | 2.681307E-05 | -3.758281E-06 | 2.646951E-07 | -7.475832E-09 |
| 62 | 8.985016E-05 | -1.571899E-05 | 1.240317E-06 | -4.972033E-08 | 8.307450E-10 |
| 71 | -1.342181E-04 | 2.379486E-05 | -2.113643E-06 | 9.465344E-08 | -1.695166E-09 |
| 72 | 2.089432E-04 | -1.598414E-05 | 7.509359E-07 | -1.982411E-08 | 2.266920E-10 |
| 81 | -2.349779E-05 | 1.408173E-06 | -4.985477E-08 | 9.690580E-10 | -8.003000E-12 |
| 82 | -4.259743E-06 | 1.926308E-07 | -5.257405E-09 | 7.894800E-11 | -4.990000E-13 |

FIG. 29

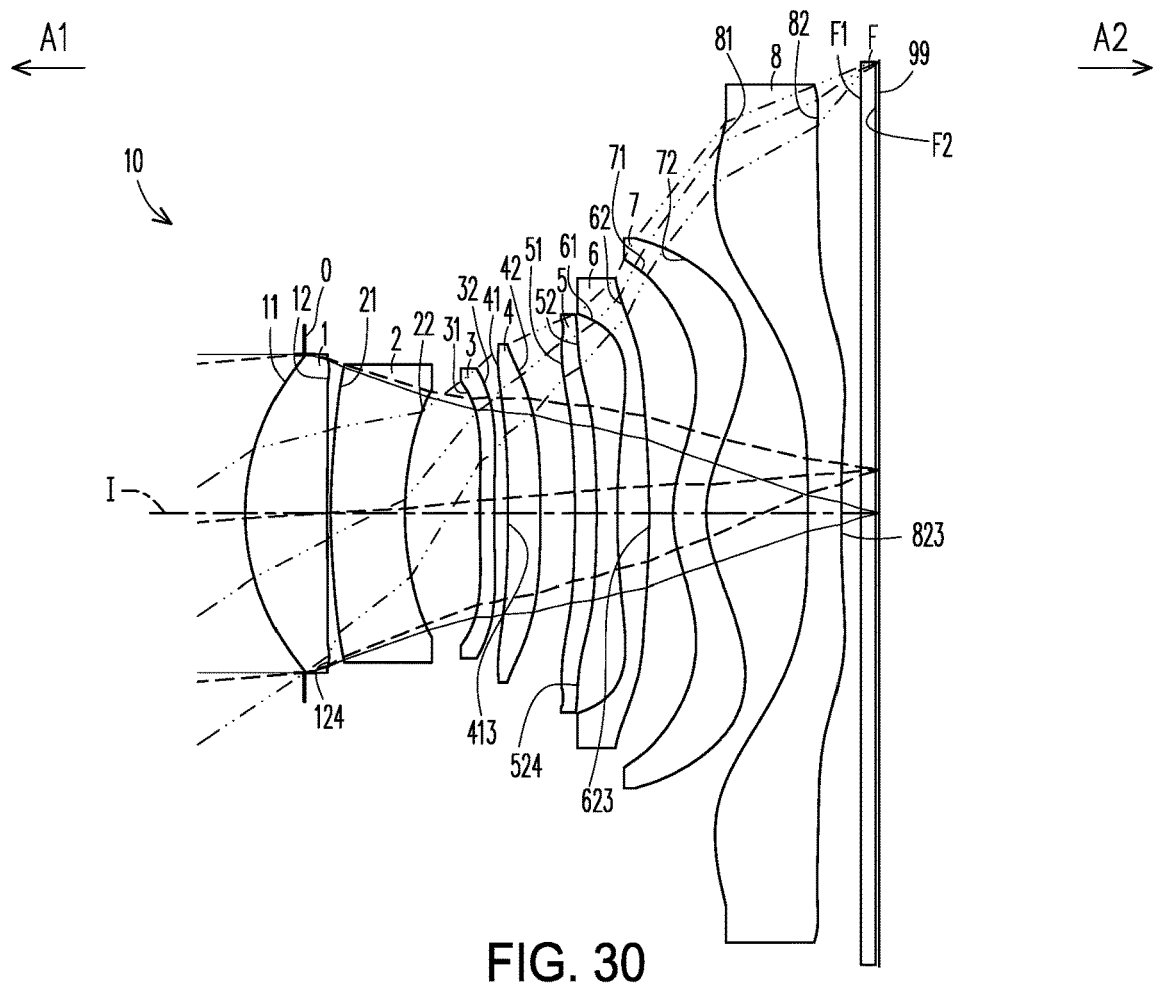
FIG. 30
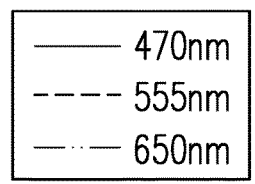
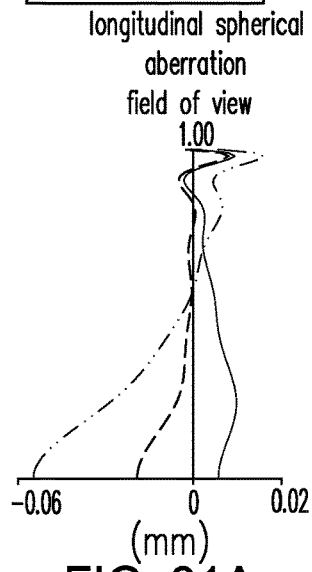
FIG. 31A
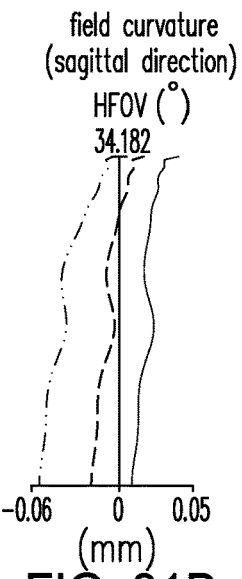
FIG. 31B
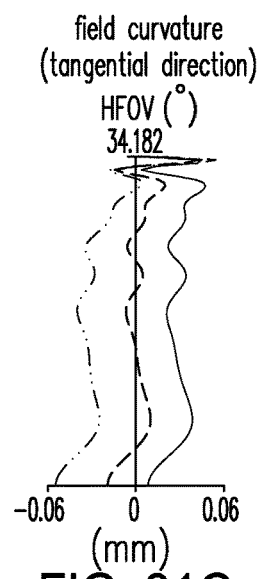
FIG. 31C
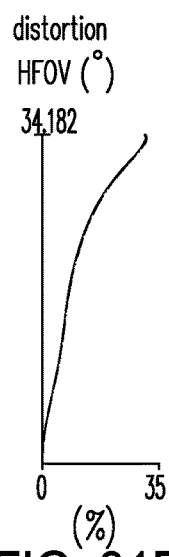
FIG. 31D

| Seventh embodiment ||||||
|---|---|---|---|---|---|
| EFL=6.951 mm, HFOV=34.182°, TTL=8.950 mm, Fno=1.544, ImgH=6.400 mm。 ||||||
| Device | Surface | Radius of curvature (mm) | Thickness (mm) | Refractive index | Abbe number | Focal length (mm) |
| Object | | Infinity | Infinity | | | |
| Aperture 0 | | Infinity | -0.833 | | | |
| First lens element 1 | Object-side surface 11 | 3.342 | 1.150 | 1.545 | 55.987 | 7.138 |
| | Image-side surface 12 | 20.524 | 0.052 | | | |
| Second lens element 2 | Object-side surface 21 | 7.761 | 1.051 | 1.671 | 19.243 | -17.642 |
| | Image-side surface 22 | 4.448 | 1.061 | | | |
| Third lens element 3 | Object-side surface 31 | 19.410 | 0.205 | 1.671 | 19.243 | 999.999 |
| | Image-side surface 32 | 19.897 | 0.197 | | | |
| Fourth lens element 4 | Object-side surface 41 | -19.386 | 0.458 | 1.545 | 55.987 | -744.742 |
| | Image-side surface 42 | -20.525 | 0.479 | | | |
| Fifth lens element 5 | Object-side surface 51 | -14.895 | 0.308 | 1.671 | 19.243 | 999.999 |
| | Image-side surface 52 | -14.696 | 0.294 | | | |
| Sixth lens element 6 | Object-side surface 61 | 16.372 | 0.449 | 1.545 | 55.987 | 13.580 |
| | Image-side surface 62 | -13.434 | 0.337 | | | |
| Seventh lens element 7 | Object-side surface 71 | 1.958 | 0.470 | 1.567 | 37.490 | -61.404 |
| | Image-side surface 72 | 1.693 | 1.436 | | | |
| Eighth lens element 8 | Object-side surface 81 | -100000.000 | 0.470 | 1.545 | 55.987 | 9999.999 |
| | Image-side surface 82 | -5179.792 | 0.272 | | | |
| Filter F | Object-side surface F1 | Infinity | 0.210 | 1.560 | 51.300 | |
| | Image-side surface F2 | Infinity | 0.049 | | | |
| | Image plane 99 | Infinity | | | | |

FIG. 32

| Surface | K | $a_4$ | $a_6$ | $a_8$ | $a_{10}$ |
|---|---|---|---|---|---|
| 11 | 2.620888E-01 | -1.058733E-03 | 5.152312E-04 | -6.535013E-04 | 3.543551E-04 |
| 12 | 0.000000E+00 | -3.212271E-02 | 2.367906E-02 | -1.096258E-02 | 3.316167E-03 |
| 21 | 7.104715E+00 | -3.223779E-02 | 2.020731E-02 | -9.106673E-03 | 2.716753E-03 |
| 22 | 3.906037E-01 | -3.482839E-03 | 1.534542E-03 | 5.391951E-05 | -8.413076E-06 |
| 31 | 0.000000E+00 | -1.942268E-02 | 1.222731E-03 | -7.325012E-03 | 4.721079E-03 |
| 32 | 1.820024E+01 | -1.145662E-02 | -2.331514E-03 | -3.339385E-03 | 2.495208E-03 |
| 41 | -1.766480E+02 | -2.747721E-03 | -8.490189E-03 | 6.745373E-03 | -2.481567E-03 |
| 42 | 3.319346E+01 | -5.326514E-03 | -1.161833E-02 | 5.389369E-03 | -9.673397E-04 |
| 51 | -4.452401E+02 | -6.541718E-03 | 9.954215E-03 | -1.461371E-02 | 7.765668E-03 |
| 52 | -2.519465E+02 | -2.516724E-03 | -2.763819E-03 | -1.109021E-03 | 2.994890E-04 |
| 61 | 0.000000E+00 | 3.694603E-02 | -4.295709E-02 | 2.614925E-02 | -9.729888E-03 |
| 62 | 0.000000E+00 | 2.203341E-02 | -2.956109E-02 | 1.908293E-02 | -6.471572E-03 |
| 71 | -4.152421E+00 | -1.548918E-02 | -1.400978E-02 | 8.203743E-03 | -2.408178E-03 |
| 72 | -1.900100E+00 | -4.627267E-02 | 7.860824E-03 | -7.460934E-04 | -2.313962E-05 |
| 81 | 0.000000E+00 | -2.319597E-02 | 3.956490E-03 | -5.731688E-04 | 5.760532E-05 |
| 82 | 0.000000E+00 | 2.640922E-02 | -1.131131E-02 | 1.803858E-03 | -1.551492E-04 |
| Surface | $a_{12}$ | $a_{14}$ | $a_{16}$ | $a_{18}$ | $a_{20}$ |
| 11 | -1.074389E-04 | 1.668950E-05 | -1.083492E-06 | | |
| 12 | -6.291835E-04 | 6.739517E-05 | -3.134573E-06 | | |
| 21 | -5.076875E-04 | 5.309297E-05 | -2.339015E-06 | | |
| 22 | -1.529996E-05 | 7.146037E-06 | -5.289633E-07 | | |
| 31 | -1.506661E-03 | 2.464891E-04 | -1.646535E-05 | | |
| 32 | -7.798118E-04 | 1.226666E-04 | -7.819208E-06 | | |
| 41 | 4.936170E-04 | -4.955054E-05 | 1.978627E-06 | | |
| 42 | 2.904923E-05 | 1.123143E-05 | -9.362796E-07 | | |
| 51 | -2.111968E-03 | 3.340150E-04 | -3.139705E-05 | 1.644344E-06 | -3.743151E-08 |
| 52 | 2.110407E-04 | -9.274592E-05 | 1.483679E-05 | -1.100511E-06 | 3.175508E-08 |
| 61 | 2.286861E-03 | -3.503290E-04 | 3.434102E-05 | -1.963109E-06 | 4.943399E-08 |
| 62 | 1.263892E-03 | -1.489059E-04 | 1.050409E-05 | -4.096926E-07 | 6.807121E-09 |
| 71 | 4.360519E-04 | -5.002208E-05 | 3.527130E-06 | -1.390578E-07 | 2.339693E-09 |
| 72 | 1.570635E-05 | -2.010643E-06 | 1.277011E-07 | -4.019625E-09 | 4.775500E-11 |
| 81 | -3.568974E-06 | 1.353890E-07 | -3.084302E-09 | 3.885900E-11 | -2.080000E-13 |
| 82 | 8.079781E-06 | -2.634303E-07 | 5.273698E-09 | -5.938600E-11 | 2.880000E-13 |

FIG. 33

| Condition | First embodiment | Second embodiment | Third embodiment | Fourth embodiment | Fifth embodiment | Sixth embodiment | Seventh embodiment |
|---|---|---|---|---|---|---|---|
| T1 | 1.046 | 1.268 | 0.769 | 1.144 | 1.046 | 1.149 | 1.150 |
| G12 | 0.064 | 0.115 | 0.116 | 0.111 | 0.179 | 0.113 | 0.052 |
| T2 | 0.330 | 0.522 | 0.839 | 0.315 | 0.192 | 0.440 | 1.051 |
| G23 | 0.582 | 0.607 | 0.548 | 1.103 | 1.072 | 0.837 | 1.061 |
| T3 | 0.345 | 0.349 | 0.299 | 0.285 | 0.305 | 0.299 | 0.205 |
| G34 | 0.151 | 0.079 | 0.068 | 0.135 | 0.425 | 0.087 | 0.197 |
| T4 | 0.894 | 0.815 | 1.198 | 1.914 | 0.822 | 0.854 | 0.458 |
| G45 | 0.264 | 0.307 | 0.253 | 0.043 | 0.069 | 0.306 | 0.479 |
| T5 | 0.634 | 0.572 | 0.384 | 0.242 | 0.170 | 0.577 | 0.308 |
| G56 | 0.364 | 0.106 | 0.075 | 1.895 | 0.037 | 0.233 | 0.294 |
| T6 | 0.704 | 0.607 | 0.713 | 0.966 | 0.826 | 0.497 | 0.449 |
| G67 | 0.049 | 0.065 | 0.129 | 0.541 | 0.013 | 0.094 | 0.337 |
| T7 | 0.352 | 0.526 | 0.541 | 0.334 | 1.027 | 0.490 | 0.470 |
| G78 | 1.314 | 1.211 | 1.955 | 3.420 | 1.310 | 1.301 | 1.436 |
| T8 | 0.581 | 0.795 | 0.694 | 0.320 | 1.028 | 0.492 | 0.470 |
| G8F | 0.272 | 0.272 | 0.350 | 0.500 | 0.572 | 0.272 | 0.272 |
| TF | 0.210 | 0.210 | 0.210 | 0.249 | 0.210 | 0.210 | 0.210 |
| GFP | 0.307 | 0.438 | 0.076 | 0.194 | 0.154 | 0.737 | 0.049 |
| BFL | 0.789 | 0.921 | 0.636 | 0.943 | 0.936 | 1.220 | 0.532 |
| EFL | 6.384 | 6.785 | 6.370 | 6.609 | 7.081 | 7.038 | 6.951 |
| TL | 7.675 | 7.944 | 8.580 | 12.768 | 8.520 | 7.769 | 8.418 |
| TTL | 8.465 | 8.864 | 9.217 | 13.711 | 9.456 | 8.988 | 8.950 |
| ALT | 4.887 | 5.453 | 5.436 | 5.520 | 5.416 | 4.798 | 4.562 |
| AAG | 2.789 | 2.491 | 3.144 | 7.248 | 3.104 | 2.970 | 3.856 |
| Tmax | 1.046 | 1.268 | 1.198 | 1.914 | 1.046 | 1.149 | 1.150 |
| V1 | 56.708 | 55.987 | 55.987 | 55.987 | 55.987 | 55.987 | 55.987 |
| V2 | 18.154 | 20.373 | 19.243 | 19.243 | 19.243 | 19.243 | 19.243 |
| V3 | 37.666 | 20.373 | 18.154 | 18.154 | 19.243 | 19.243 | 19.243 |
| V4 | 56.708 | 55.987 | 37.533 | 37.490 | 55.987 | 55.987 | 55.987 |
| V5 | 25.754 | 20.373 | 19.243 | 19.243 | 19.243 | 19.243 | 19.243 |
| V6 | 56.708 | 49.922 | 55.987 | 55.987 | 55.987 | 55.987 | 55.987 |
| V7 | 37.666 | 57.062 | 37.533 | 19.243 | 37.490 | 37.490 | 37.490 |
| V8 | 56.708 | 55.987 | 55.987 | 55.987 | 55.987 | 55.987 | 55.987 |

FIG. 34

| Condition | First embodiment | Second embodiment | Third embodiment | Fourth embodiment | Fifth embodiment |
|---|---|---|---|---|---|
| D31t62/D71t82 | 1.495 | 1.120 | 0.937 | 1.345 | 0.789 |
| D11t62/D71t82 | 2.395 | 2.111 | 1.649 | 2.001 | 1.528 |
| V1+V2+V3+V4+V5 | 194.990 | 173.093 | 150.160 | 150.117 | 169.703 |
| ALT/(G23+G78) | 2.577 | 2.999 | 2.172 | 1.220 | 2.274 |
| TL/BFL | 9.723 | 8.628 | 13.483 | 13.543 | 9.103 |
| AAG/EFL | 0.437 | 0.367 | 0.494 | 1.097 | 0.438 |
| TTL/T1 | 8.091 | 6.990 | 11.992 | 11.988 | 9.043 |
| EFL/(T5+T6+T7) | 3.779 | 3.980 | 3.889 | 4.286 | 3.499 |
| ALT/(Tmax+G78) | 2.070 | 2.199 | 1.724 | 1.035 | 2.300 |
| (T1+G12+T2+G23+T3)/BFL | 3.000 | 3.106 | 4.038 | 3.137 | 2.984 |
| AAG/(T3+G34+T4) | 2.005 | 2.005 | 2.010 | 3.105 | 2.001 |
| TTL/(EFL+BFL) | 1.180 | 1.150 | 1.315 | 1.816 | 1.179 |
| (T1+T4)/(T6+T7) | 1.839 | 1.839 | 1.568 | 2.352 | 1.008 |
| ALT/(T1+T4) | 2.518 | 2.618 | 2.764 | 1.805 | 2.900 |
| (T4+G45+T5+G56+T6)/BFL | 3.624 | 2.615 | 4.122 | 5.367 | 2.056 |
| AAG/(T6+G67) | 3.705 | 3.705 | 3.735 | 4.808 | 3.700 |
| TL/(EFL+Tmax) | 1.033 | 0.986 | 1.134 | 1.498 | 1.048 |
| T8/T7 | 1.652 | 1.511 | 1.282 | 0.956 | 1.001 |

FIG. 35

| Condition | Sixth embodiment | Seventh embodiment |
|---|---|---|
| D31t62/D71t82 | 1.249 | 1.006 |
| D11t62/D71t82 | 2.361 | 2.400 |
| V1+V2+V3+V4+V5 | 169.703 | 169.703 |
| ALT/(G23+G78) | 2.244 | 1.827 |
| TL/BFL | 6.370 | 15.834 |
| AAG/EFL | 0.422 | 0.555 |
| TTL/T1 | 7.821 | 7.782 |
| EFL/(T5+T6+T7) | 4.499 | 5.663 |
| ALT/(Tmax+G78) | 1.958 | 1.764 |
| (T1+G12+T2+G23+T3)/BFL | 2.327 | 6.620 |
| AAG/(T3+G34+T4) | 2.395 | 4.481 |
| TTL/(EFL+BFL) | 1.089 | 1.196 |
| (T1+T4)/(T6+T7) | 2.030 | 1.748 |
| ALT/(T1+T4) | 2.395 | 2.837 |
| (T4+G45+T5+G56+T6)/BFL | 2.022 | 3.739 |
| AAG/(T6+G67) | 5.034 | 4.903 |
| TL/(EFL+Tmax) | 0.949 | 1.039 |
| T8/T7 | 1.003 | 1.000 |

FIG. 36

OPTICAL IMAGING LENS

CROSS-REFERENCE TO RELATED APPLICATION

This application claims the priority benefit of Chinese application no. 202111623994.9, filed on Dec. 28, 2021. The entirety of the above-mentioned patent application is hereby incorporated by reference herein and made a part of this specification.

BACKGROUND

Technical Field

The disclosure relates to an optical element, and particularly an optical imaging lens.

Description of Related Art

In recent years, optical imaging lenses have continued to be improved with a broader range of applications. In addition to the requirement for slim, thin and short optical imaging lens, the design of a small F-number (Fno) helps to increase luminous flux, and a large field of view has gradually become a trend. Moreover, in order to improve pixel and resolution, the image height of the optical imaging lens has be increased, and a larger image sensor is adopted to receive the imaging rays to meet the demand for high pixel. Therefore, how to design an optical imaging lens that is light, thin, short and small, has a small F-number, a large image height, and good image quality has become an issue to be solved.

SUMMARY

The disclosure provides an optical imaging lens that can achieve a small F-number, a large image height, and excellent image quality.

An embodiment of the disclosure provides an optical imaging lens including a first lens element, a second lens element, a third lens element, a fourth lens element, a fifth lens element, a sixth lens element, a seventh lens element, and an eighth lens element sequentially arranged along an optical axis from an object side to an image side. Each of the first lens element to the eighth lens element includes an object-side surface facing the object side and allowing imaging rays to pass through and an image-side surface facing the image side and allowing the imaging rays to pass through. A periphery region of the object-side surface of the third lens element is concave, and a periphery region of the image-side surface of the third lens element is convex. A periphery region of the object-side surface of the fourth lens element is convex. The sixth lens element has positive refracting power, and an optical axis region of the object-side surface of the sixth lens element is convex. A periphery region of the image-side surface of the seventh lens element is convex. Lens elements of the optical imaging lens are only the eight lens elements described above, and the optical imaging lens satisfies the conditions of $D11t62/D71t82 \leq 2.400$, and $D11t62$ is the distance from the object-side surface of the first lens element to the image-side surface of the sixth lens element along the optical axis, and $D71t82$ is the distance from the object-side surface of the seventh lens element to the image-side surface of the eighth lens element along the optical axis.

An embodiment of the disclosure provides an optical imaging lens including a first lens element, a second lens element, a third lens element, a fourth lens element, a fifth lens element, a sixth lens element, a seventh lens element, and an eighth lens element sequentially arranged along an optical axis from an object side to an image side. Each of the first lens element to the eighth lens element includes an object-side surface facing the object side and allowing imaging rays to pass through and an image-side surface facing the image side and allowing the imaging rays to pass through. A periphery region of the object-side surface of the third lens element is concave, and a periphery region of the image-side surface of the third lens element is convex. A periphery region of the object-side surface of the fourth lens element is convex. The sixth lens element has positive refracting power, and an optical axis region of the object-side surface of the sixth lens element is convex. A periphery region of the image-side surface of the eighth lens element is convex. Lens elements of the optical imaging lens are only the eight lens elements described above, and the optical imaging lens satisfies the conditions of $D11t62/D71t82 \leq 2.400$, and $D11t62$ is the distance from the object-side surface of the first lens element to the image-side surface of the sixth lens element along the optical axis, and $D71t82$ is the distance from the object-side surface of the seventh lens element to the image-side surface of the eighth lens element along the optical axis.

An embodiment of the disclosure provides an optical imaging lens including a first lens element, a second lens element, a third lens element, a fourth lens element, a fifth lens element, a sixth lens element, a seventh lens element, and an eighth lens element sequentially arranged along an optical axis from an object side to an image side. Each of the first lens element to the eighth lens element includes an object-side surface facing the object side and allowing imaging rays to pass through and an image-side surface facing the image side and allowing the imaging rays to pass through. A periphery region of the object-side surface of the third lens element is concave, and a periphery region of the image-side surface of the third lens element is convex. The sixth lens element has positive refracting power, and the optical axis region of the object-side surface of the sixth lens element is convex. The optical axis region of the image-side surface of the seventh lens element is concave. The optical axis region of the object-side surface of the eighth lens element is concave, and the periphery region of the object-side surface of the eighth lens element is convex. Lens elements of the optical imaging lens are only the eight lens elements described above, and the optical imaging lens satisfies the conditions of $D11t62/D71t82 \leq 1.500$, and $D31t62$ is the distance from the object-side surface of the third lens element to the image-side surface of the sixth lens element along the optical axis, and $D71t82$ is the distance from the object-side surface of the seventh lens element to the image-side surface of the eighth lens element along the optical axis.

Based on the above, the advantageous effect of the optical imaging lens in the embodiment of the disclosure is that by satisfying the concave-convex surface arrangement design of the lens elements, the condition of refracting power, and the design satisfying the above-mentioned conditional expression, the optical imaging lens can simultaneously decrease the F-number, increase the image height, improve the resolution and meet the image quality.

BRIEF DESCRIPTION OF THE DRAWINGS

FIG. 8 provides detailed optical data of the optical imaging lens of the first embodiment of the disclosure.

FIG. 9 provides aspherical parameters of the optical imaging lens of the first embodiment of the disclosure.

FIG. 10 is a schematic view of an optical imaging lens according to the second embodiment of the disclosure.

FIG. 11A to FIG. 11D are schematic views showing a longitudinal spherical aberration and other aberrations of the optical imaging lens of the second embodiment.

FIG. 12 provides detailed optical data of the optical imaging lens of the second embodiment of the disclosure.

FIG. 13 provides aspherical parameters of the optical imaging lens of the second embodiment of the disclosure.

FIG. 14 is a schematic view of an optical imaging lens according to the third embodiment of the disclosure.

FIG. 15A to FIG. 15D are schematic views showing a longitudinal spherical aberration and other aberrations of the optical imaging lens of the third embodiment.

FIG. 16 provides detailed optical data of the optical imaging lens of the third embodiment of the disclosure.

FIG. 17 provides aspherical parameters of the optical imaging lens of the third embodiment of the disclosure.

FIG. 18 is a schematic view of an optical imaging lens according to the fourth embodiment of the disclosure.

FIG. 19A to FIG. 19D are schematic views showing a longitudinal spherical aberration and other aberrations of the optical imaging lens of the fourth embodiment.

FIG. 20 provides detailed optical data of the optical imaging lens of the fourth embodiment of the disclosure.

FIG. 21 provides aspherical parameters of the optical imaging lens of the fourth embodiment of the disclosure.

FIG. 22 is a schematic view of an optical imaging lens according to the fifth embodiment of the disclosure.

FIG. 23A to FIG. 23D are schematic views showing a longitudinal spherical aberration and other aberrations of the optical imaging lens of the fifth embodiment.

FIG. 24 provides detailed optical data of the optical imaging lens of the fifth embodiment of the disclosure.

FIG. 25 provides aspherical parameters of the optical imaging lens of the fifth embodiment of the disclosure.

FIG. 26 is a schematic view of an optical imaging lens according to the sixth embodiment of the disclosure.

FIG. 27A to FIG. 27D are schematic views showing a longitudinal spherical aberration and other aberrations of the optical imaging lens of the sixth embodiment.

FIG. 28 provides detailed optical data of the optical imaging lens of the sixth embodiment of the disclosure.

FIG. 29 provides aspherical parameters of the optical imaging lens of the sixth embodiment of the disclosure.

FIG. 30 is a schematic view of an optical imaging lens according to the seventh embodiment of the disclosure.

FIG. 31A to FIG. 31D are schematic views showing a longitudinal spherical aberration and other aberrations of the optical imaging lens of the seventh embodiment.

FIG. 32 provides detailed optical data of the optical imaging lens of the seventh embodiment of the disclosure.

FIG. 33 provides aspherical parameters of the optical imaging lens of the seventh embodiment of the disclosure.

FIG. 34 to FIG. 36 show important parameters and relation values thereof pertaining to the optical imaging lens according to the first through the seventh embodiments of the disclosure.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
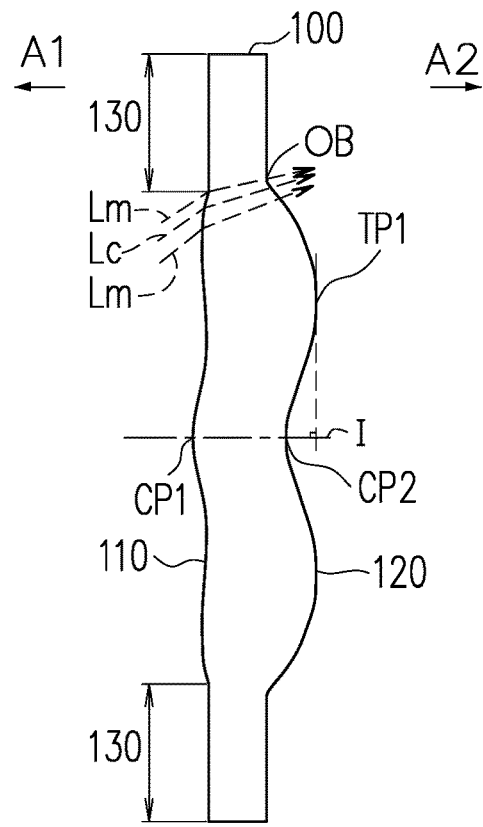
FIG. 1 is a schematic view illustrating the surface structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optic al axis region, a periphery region, and, in some cases, one or more intermediate regions, as discussed more fully below.

Figure 4:
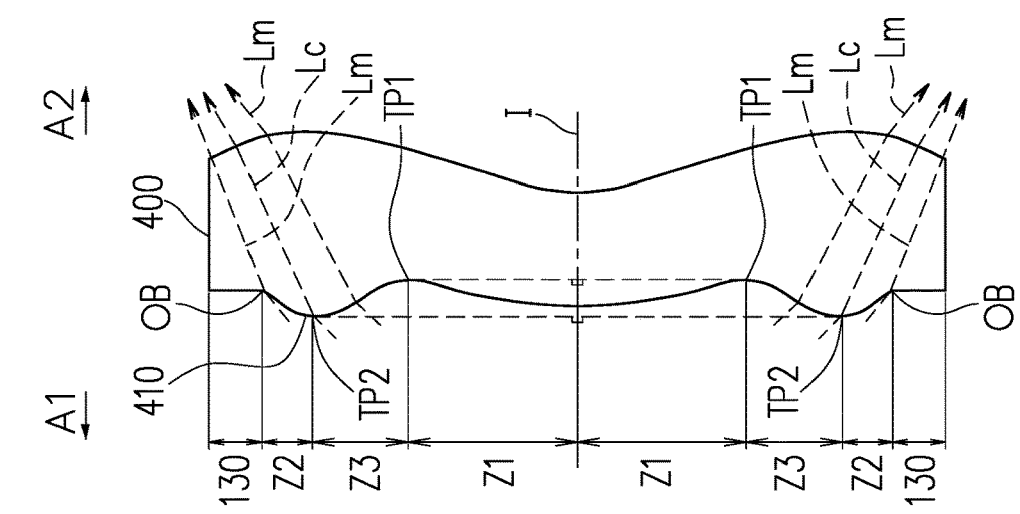
FIG. 4 is a schematic view illustrating a surface structure of a lens element according to an Example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
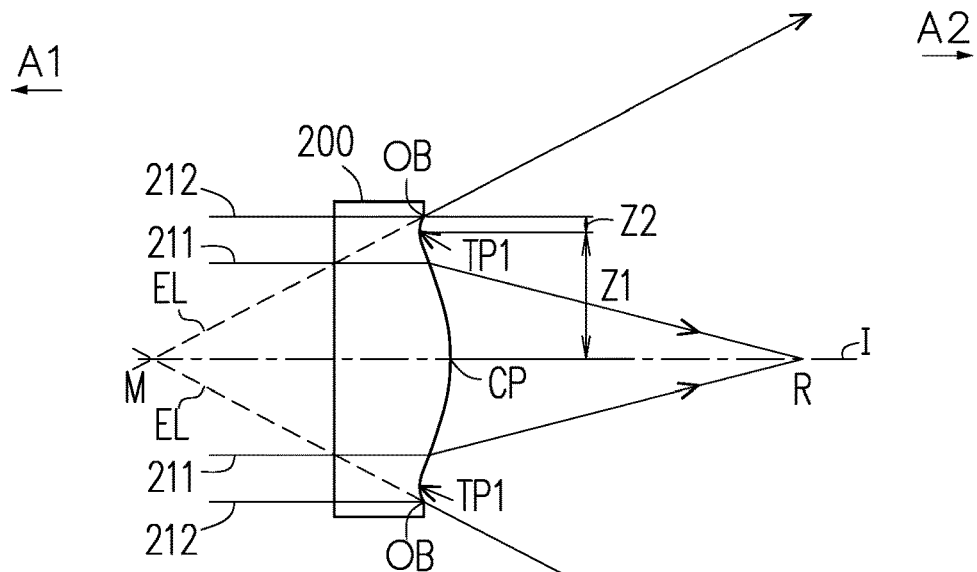
FIG. 2 is a schematic view illustrating a concave-convex surface structure of a lens element and a ray focal point.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
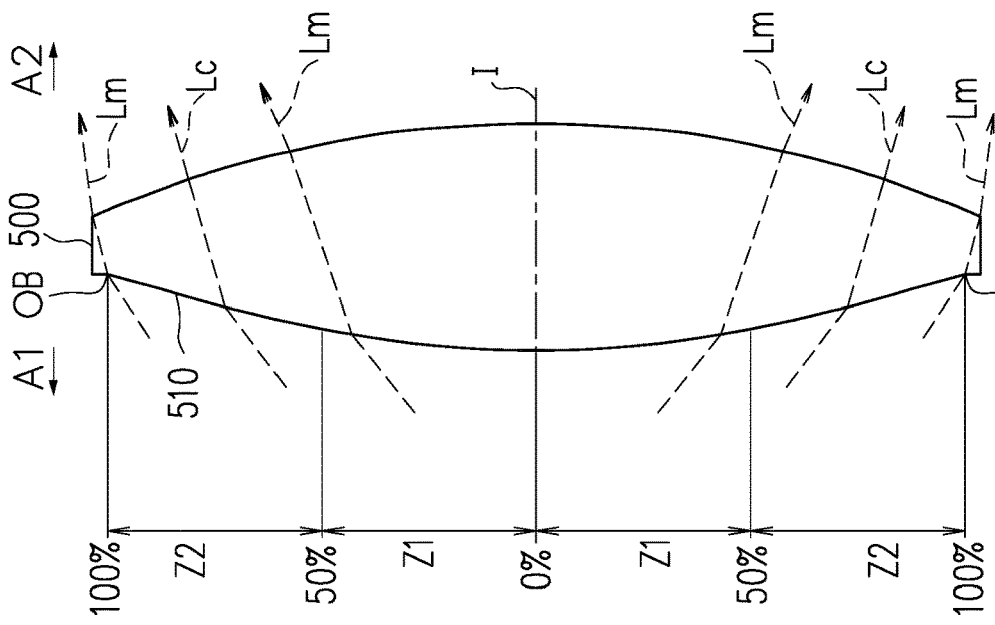
FIG. 5 is a schematic view illustrating a surface structure of a lens element according to an Example 3.
Figure 3:
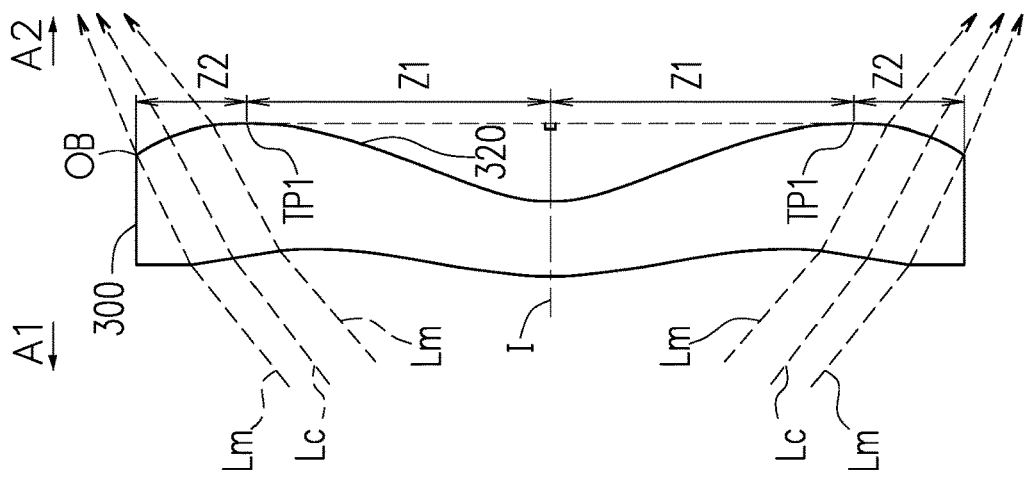
FIG. 3 is a schematic view illustrating a surface structure of a lens element according to an Example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
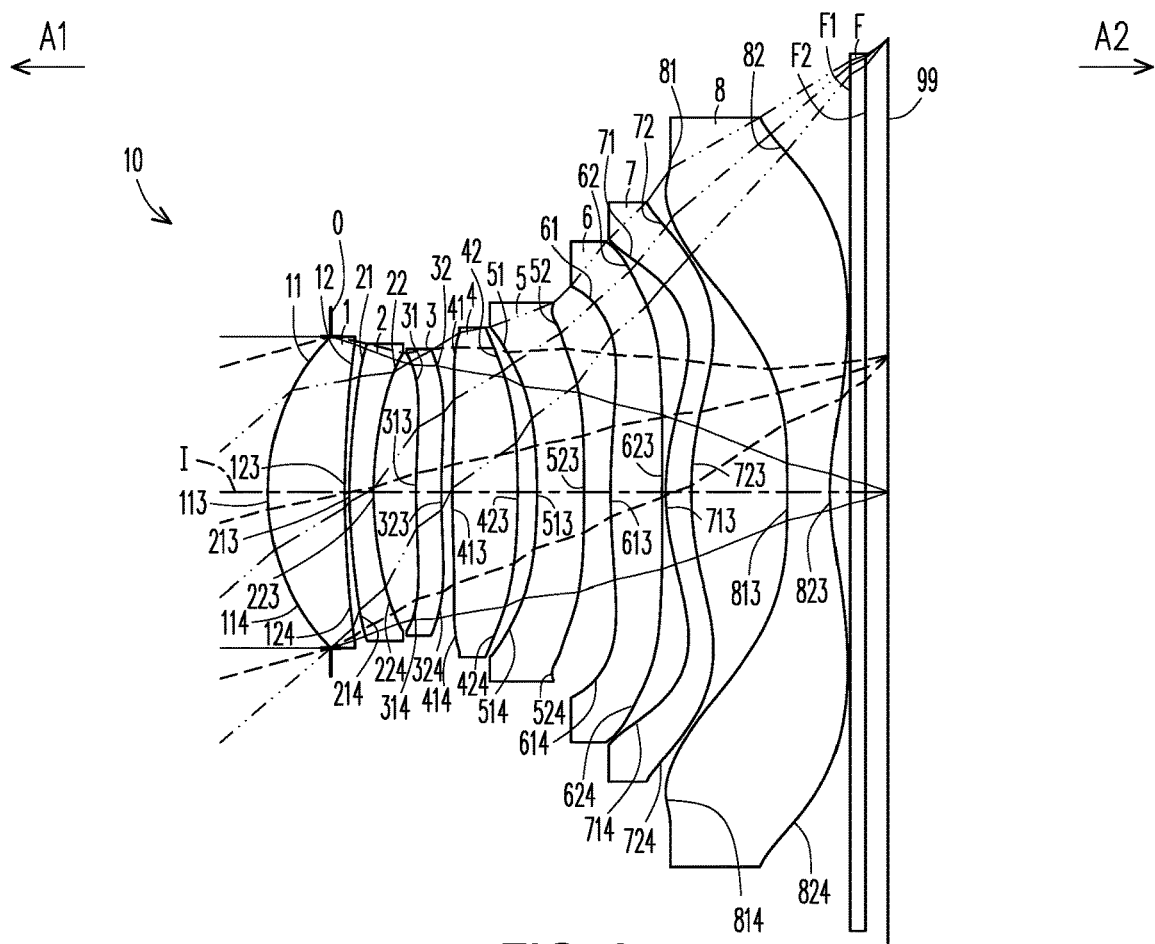
FIG. 6 is a schematic view illustrating an imaging optical lens according to a first embodiment of the disclosure.

FIG. 6 is a schematic view illustrating an imaging optical lens according to a first embodiment of the disclosure, and FIG. 7A to FIG. 7D are schematic views showing a longitudinal spherical aberration and other aberrations of the optical imaging lens of the first embodiment. Referring to FIG. 6 first, an optical imaging lens 10 of the first embodiment of the disclosure includes a first lens element 1, a second lens element 2, a third lens element 3, a fourth lens element 4, a fifth lens element 5, a sixth lens element 6, a seventh lens element 7, an eighth lens element 8 and a filter F sequentially arranged along an optical axis I of the optical imaging lens 10 from an object side A1 to an image side A2. An aperture 0 is set on the object-side surface 11 of the first lens element 1. When the light emitted by an object to be captured enters the optical imaging lens 10, and passes through the aperture 0, the first lens element 1, the second lens element 2, the third lens element 3, the fourth lens element 4, the fifth lens element 5, the sixth lens element 6, the seventh lens element 7, the eighth lens element 8 and the filter F, an image is formed on an image plane 99. The filter F is disposed between the image-side surface 82 of the eighth lens element 8 and the image plane 99. It should be added that the object side A1 is the side facing the object to be captured, and the image side A2 is the side facing the image plane 99. In an embodiment, the filter F may be an infrared cut filter (IR Cut Filter), but the disclosure is not limited thereto.

In this embodiment, each of the first lens element 1, the second lens element 2, the third lens element 3, the fourth lens element 4, the fifth lens element 5, the sixth lens element 6, the seventh lens element 7, the eighth lens element 8, and the filter F of the optical imaging lens 10 has an object-side surface 11, 21, 31, 41, 51, 61, 71, 81, F1 facing the object side A1 and allowing the imaging rays to pass through, and an image-side surface 12, 22, 32, 42, 52, 62, 72, 82, F2 facing the image side A2 and allowing the imaging rays to pass through.

The first lens element 1 has positive refracting power. The material of the first lens element 1 is plastic, but the disclosure is not limited thereto. The optical axis region 113 of the object-side surface 11 of the first lens element 1 is convex, and its periphery region 114 is convex. The optical axis region 123 of the image-side surface 12 of the first lens element 1 is concave, and its periphery region 124 is concave. In this embodiment, both the object-side surface 11 and the image-side surface 12 of the first lens element 1 are aspheric surfaces, but the disclosure is not limited thereto.

The second lens element 2 has negative refracting power. The material of the second lens element 2 is plastic, but the disclosure is not limited thereto. The optical axis region 213 of the object-side surface 21 of the second lens element 2 is convex, and its periphery region 214 is convex. The optical axis region 223 of the image-side surface 22 of the second lens element 2 is concave, and its periphery region 224 is concave. In this embodiment, both the object-side surface 21 and the image-side surface 22 of the second lens element 2 are aspheric surfaces, but the disclosure is not limited thereto.

The third lens element 3 has negative refracting power. The material of the third lens element 3 is plastic, but the disclosure is not limited thereto. The optical axis region 313 of the object-side surface 31 of the third lens element 3 is convex, and its periphery region 314 is concave. The optical axis region 323 of the image-side surface 32 of the third lens element 3 is concave, and its periphery region 324 is convex. In this embodiment, both the object-side surface 31 and the image-side surface 32 of the third lens element 3 are aspheric surfaces, but the disclosure is not limited thereto.

The fourth lens element 4 has positive refracting power. The material of the fourth lens element 4 is plastic, but the disclosure is not limited thereto. The optical axis region 413 of the object-side surface 41 of the fourth lens element 4 is convex, and its periphery region 414 is convex. The optical axis region 423 of the image-side surface 42 of the fourth lens element 4 is convex, and its periphery region 424 is convex. In this embodiment, both the object-side surface 41 and the image-side surface 42 of the fourth lens element 4 are aspheric surfaces, but the disclosure is not limited thereto.

The fifth lens element 5 has negative refracting power. The material of the fifth lens element 5 is plastic, but the disclosure is not limited thereto. The optical axis region 513 of the object-side surface 51 of the fifth lens element 5 is concave, and its periphery region 514 is concave. The optical axis region 523 of the image-side surface 52 of the fifth lens element 5 is convex, and its periphery region 524 is concave. In this embodiment, both the object-side surface 51 and the image-side surface 52 of the fifth lens element 5 are aspheric surfaces, but the disclosure is not limited thereto.

The sixth lens element 6 has positive refracting power. The material of the sixth lens element 6 is plastic, but the disclosure is not limited thereto. The optical axis region 613 of the object-side surface 61 of the sixth lens element 6 is convex, and its periphery region 614 is concave. The optical axis region 623 of the image-side surface 62 of the sixth lens element 6 is concave, and its periphery region 624 is convex. In this embodiment, both the object-side surface 61 and the image-side surface 62 of the sixth lens element 6 are aspheric surfaces, but the disclosure is not limited thereto.

The seventh lens element 7 has positive refracting power. The material of the seventh lens element 7 is plastic, but the disclosure is not limited thereto. The optical axis region 713 of the object-side surface 71 of the seventh lens element 7 is convex, and its periphery region 714 is concave. The optical axis region 723 of the image-side surface 72 of the seventh lens element 7 is concave, and its periphery region 724 is convex. In this embodiment, both the object-side surface 71 and the image-side surface 72 of the seventh lens element 7 are aspheric surfaces, but the disclosure is not limited thereto.

The eighth lens element 8 has negative refracting power. The material of the eighth lens element 8 is plastic, but the disclosure is not limited thereto. The optical axis region 813 of the object-side surface 81 of the eighth lens element 8 is concave, and its periphery region 814 is convex. The optical axis region 823 of the image-side surface 82 of the eighth lens element 8 is concave, and its periphery region 824 is convex. In this embodiment, both the object-side surface 81 and the image-side surface 82 of the eighth lens element 8 are aspheric surfaces, but the disclosure is not limited thereto.

In the embodiment, lens elements of the optical imaging lens 10 are only the eight lens elements described above.

Other detailed optical data of the first embodiment is shown in FIG. 8, with regard to the optical imaging lens 10 of the first embodiment, the effective focal length (EFL) of is 6.384 mm (millimeter), the half field of view (HFOV) is 40.803°, the F-number (Fno) is 1.500, the system length is 8.465 mm, and the image height is 6.200 mm. The system length refers to the distance from the object-side surface 11 of the first lens element 1 to the image plane 99 along the optical axis I.

Moreover, in this embodiment, the object-side surfaces 11, 21, 31, 41, 51, 52, 71, 81 and the image-side surfaces 12, 22, 32, 42, 52, 62, 72, 82 of the first lens element 1, the second lens element 2, the third lens element 3, the fourth lens element 4, the fifth lens element 5, the sixth lens element 6, the seventh lens element 7, and the eighth lens element 8, which are sixteen surfaces in total are aspheric surfaces. The object-side surfaces 11, 21, 31, 41, 51, 52, 71, 81 and image-side surfaces 12, 22, 32, 42, 52, 62, 72, 82 are even aspheric surfaces. These aspheric surfaces are defined by the following formula:

$$Z(Y) = \frac{Y^2}{R}/(1 + \sqrt{1-(1+K)\frac{Y^2}{R^2}}) + \sum_{i=1}^{n} a_i \times Y^i \quad (1)$$

wherein:
R: a radius of curvature of the surface of the lens element close to the optical axis I;
Z: a depth of the aspheric surface (a perpendicular distance between the point on the aspheric surface that is spaced by the distance Y from the optical axis I and a tangent plane tangent to a vertex of the aspheric surface on the optical axis I);
Y: a distance between a point on an aspherical curve and the optical axis I;
K: a conic constant; and
$a_i$: $i^{th}$ aspheric coefficient.

The aspherical coefficients of the object-side surface 11 of the first lens element 1 through the image-side surface 82 of the eighth lens element 8 in the equation (1) are shown in FIG. 9. Specifically, the field number 11 of FIG. 9 indicates the aspherical coefficients of the object-side surface 11 of the first lens element 1, and so on. In this embodiment and the following embodiments, the second-order aspherical coefficient $a_2$ is zero.

Furthermore, a relationship between important parameters of the optical imaging lens 10 of the first embodiment is shown in FIG. 34 and FIG. 35.
wherein:
T1 is a thickness of the first lens element 1 along the optical axis I;
T2 is a thickness of the second lens element 2 along the optical axis I;
T3 is a thickness of the third lens element 3 along the optical axis I;
T4 is a thickness of the fourth lens element 4 along the optical axis I;
T5 is a thickness of the fifth lens element 5 along the optical axis I;
T6 is a thickness of the sixth lens element 6 along the optical axis I;
T7 is a thickness of the seventh lens element 7 along the optical axis I;
T8 is a thickness of the eighth lens element 8 along the optical axis I;
TF is a thickness of the filter F along the optical axis I;
G12 is an air gap between the first lens element 1 and the second lens element 2 along the optical axis I, and also a distance from the image-side surface 12 of the first lens element 1 to the object-side surface 21 of the second lens element 2 along the optical axis I;
G23 is an air gap between the second lens element 2 and the third lens element 3 along the optical axis I, and also a distance from the image-side surface 22 of the second lens element 2 to the object-side surface 31 of the third lens element 3 along the optical axis I;
G34 is an air gap between the third lens element 3 and the fourth lens element 4 along the optical axis I, and also a distance from the image-side surface 32 of the third lens element 3 to the object-side surface 41 of the fourth lens element 4 along the optical axis I;
G45 is an air gap between the fourth lens element 4 and the fifth lens element 5 along the optical axis I, and also a distance from the image-side surface 42 of the fourth lens element 4 to the object-side surface 51 of the fifth lens element 5 along the optical axis I;
G56 is an air gap between the fifth lens element 5 and the sixth lens element 6 along the optical axis I, and also a distance from the image-side surface 52 of the fifth lens element 5 to the object-side surface 61 of the sixth lens element 6 along the optical axis I;
G67 is an air gap between the sixth lens element 6 and the seventh lens element 7 along the optical axis I, and also a distance from the image-side surface 62 of the sixth lens element 6 to the object-side surface 71 of the seventh lens element 7 along the optical axis I;
G78 is an air gap between the seventh lens element 7 and the eighth lens element 8 along the optical axis I, and also a distance from the image-side surface 72 of the seventh lens element 7 to the object-side surface 81 of the eighth lens element 8 along the optical axis I;
G8F is an air gap between the eighth lens element 8 and the filter F along the optical axis I, and also a distance from the image-side surface 82 of the eighth lens element 8 to the object-side surface F1 of the filter F along the optical axis I;
GFP is an air gap between the filter F and the image plane 99 along the optical axis I, and also a distance from the image-side surface F2 of the filter F to the image plane 99 along the optical axis I;
AAG is a sum of seven air gaps respectively between the first lens element 1 through the eighth lens element 8 along the optical axis I, i.e., the sum of air gaps G12, G23, G34, G45, G56, G67 and G78;
ALT is a sum of thicknesses of eight lens elements of the first lens element 1 through the eighth lens element 8 along the optical axis I, i.e., the sum of thicknesses T1, T2, T3, T4, T5, T6, T7 and T8;
TL is a distance from the object-side surface 11 of the first lens element 1 to the image-side surface 82 of the eighth lens element 8 along the optical axis I;
TTL is a distance from the object-side surface 11 of the first lens element 1 to the image plane 99 along the optical axis I;

BFL is a distance from the image-side surface 82 of the eighth lens element 8 to the image plane 99 along the optical axis I;

EFL is an effective focal length of the optical imaging lens 10;

HFOV is a half field of view of the optical imaging lens 10;

ImgH is an image height of the optical imaging lens 10;

Fno is a f-number of the optical imaging lens 10.

It is further defined that:

D11t62 is a distance from the object-side surface 11 of the first lens element 1 to the image-side surface 62 of the sixth lens element 6 along the optical axis I, namely a sum of T1, G12, T2, G23, T3, G34, T4, G45, T5, G56 and T6;

D31t62 is a distance from the object-side surface 31 of the third lens element 3 to the image-side surface 62 of the sixth lens element 6 on the optical axis I, that is, a sum of T3, G34, T4, G45, T5, G56 and T6;

D71t82 is a distance from the object-side surface 71 of the seventh lens element 7 to the image-side surface 82 of the eighth lens element 8 along the optical axis I, that is, a sum of T7, G78, and T8;

Tmax is a maximum value of the thicknesses of the first lens element 1 through the eighth lens element 8 along the optical axis I, that is, the maximum value among T1, T2, T3, T4, T5, T6, T7, and T8;

Tmin is a minimum value of the thicknesses of the first lens element 1 through the eighth lens element 8 along the optical axis I, that is, the minimum value among T1, T2, T3, T4, T5, T6, T7, and T8;

Gmax is a maximum value of the seven air gaps between the first lens element 1 and the eighth lens element 8 along the optical axis I, that is, the maximum value among G12, G23, G34, G45, G56, G67, and G78;

f1 is a focal length of the first lens element 1;
f2 is a focal length of the second lens element 2;
f3 is a focal length of the third lens element 3;
f4 is a focal length of the fourth lens element 4;
f5 is a focal length of the fifth lens element 5;
f6 is a focal length of the sixth lens element 6;
f7 is a focal length of the seventh lens element 7;
f8 is a focal length of the eighth lens element 8;
n1 is a refractive index of the first lens element 1;
n2 is a refractive index of the second lens element 2;
n3 is a refractive index of the third lens element 3;
n4 is a refractive index of the fourth lens element 4;
n5 is a refractive index of the fifth lens element 5;
n6 is a refractive index of the sixth lens element 6;
n7 is a refractive index of the seventh lens element 7;
n8 is a refractive index of the eighth lens element 8;
v1 is an Abbe number, which may also be called a dispersion coefficient, of the first lens element 1;
v2 is an Abbe number of the second lens element 2;
v3 is an Abbe number of the third lens element 3;
v4 is an Abbe number of the fourth lens element 4;
v5 is an Abbe number of the fifth lens element 5;
v6 is an Abbe number of the sixth lens element 6;
v7 is an Abbe number of the seventh lens element 7; and
v8 is an Abbe number of the eighth lens element 8.

Figure 7A:
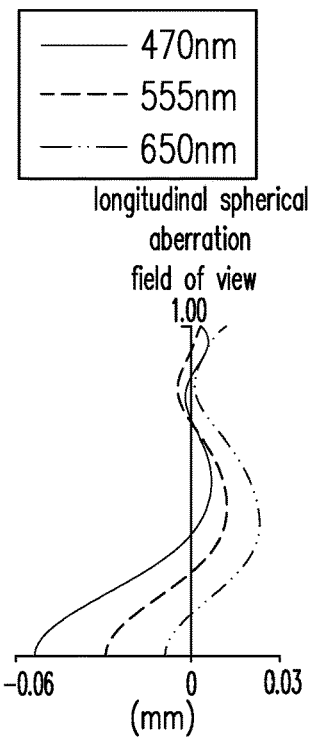
FIG. 7A to FIG. 7D are schematic views showing a longitudinal spherical aberration and other aberrations of the optical imaging lens of the first embodiment.
Figure 7B:
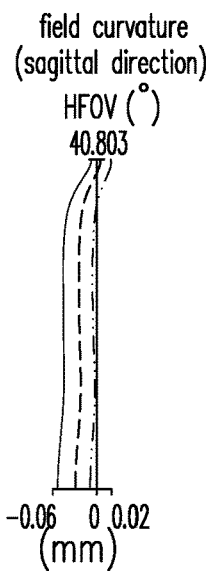
Figure 7C:
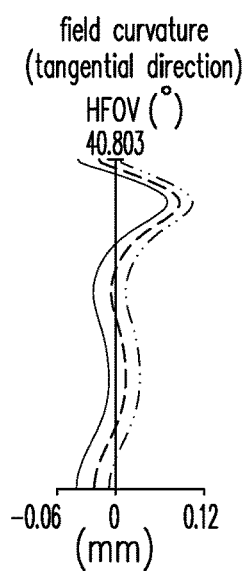
Figure 7D:
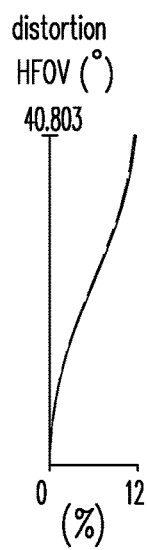

Further, referring to FIG. 7A to FIG. 7D, the diagram of FIG. 7A illustrates the longitudinal spherical aberration of the first embodiment, the diagrams of FIG. 7B and FIG. 7C respectively show a field curvature aberration in a sagittal direction and a field curvature aberration in a tangential direction on the image plane 99 of the first embodiment when the wavelength thereof is 470 nm, 555 nm and 650 nm, the diagram of FIG. 7D shows a distortion aberration on the image plane 99 of the first embodiment when the wavelength thereof is 470 nm, 555 nm and 650 nm. The longitudinal spherical aberration of the first embodiment is as shown in FIG. 7A. Curves formed by each wavelength are close to each other and are gathered in the middle, which represents that off-axis lights of different heights of each wavelength are gathered around imaging points, and according to a deviation range of the curve of each wavelength, it is learned that deviations of the imaging points of the off-axis lights of different heights are controlled within a range of ±0.06 mm, so that the spherical aberration of the same wavelength is obviously ameliorated in the first embodiment. Moreover, the distances between the three representative wavelengths are rather close, which represents that imaging positions of the lights with different wavelengths are rather close, so that a chromatic aberration is obviously ameliorated.

In the two diagrams showing field curvature aberration of FIG. 7B and FIG. 7C, variations of the focal lengths of three representative wavelengths in the whole field of view fall in a range of ±0.12 mm, which shows that the optical system of the first embodiment of the disclosure effectively eliminates aberration. The diagram of distortion aberration of FIG. 7D shows that the distortion aberration of the first embodiment is maintained in a range of ±12%, which shows that the distortion aberration of the first embodiment meets the requirement of image quality of the optical system. Accordingly, under the circumstances that the system length is reduced to 8.465 mm, the optical imaging lens of the first embodiment still provides better image quality than the conventional optical lens. Therefore, in the first embodiment, the F-number may be reduced, the image height may be increased, the resolution may be enhanced and the image quality may be met while favorable optical performance is maintained.

FIG. 10 is a schematic view of an optical imaging lens according to the second embodiment of the disclosure. FIG. 11A to FIG. 11D are schematic views showing a longitudinal spherical aberration and other aberrations of the optical imaging lens of the second embodiment. First, referring to FIG. 10, the optical imaging lens 10 of the second embodiment of the disclosure is similar to the optical imaging lens 10 of the first embodiment. They only slightly differ in some optical data, aspherical coefficients, and parameters related to the first to the eighth lens elements 1-8. Moreover, in the present embodiment, the optical axis region 523 of the image-side surface 52 of the fifth lens element 5 is concave, and its periphery region 524 is convex. It should be noted that, for clarity, the reference numerals of some optical axis regions and periphery regions that are the same as those of the first embodiment are omitted from FIG. 10.

Detailed optical data of the optical imaging lens 10 of the second embodiment is shown in FIG. 12, and in the second embodiment, the effective focal length EFL of the optical imaging lens 10 is 6.785 mm, the half field of view HFOV is 40.663°, and the f-number (Fno) is 1.500. The system length TTL is 8.864 mm and the image height is 6.200 mm.

The aspherical coefficients of the object-side surface 11 of the first lens element 1 through the image-side surface 82 of the eighth lens element 8 in the equation (1) according to the second embodiment are shown in FIG. 13.

Furthermore, the relationship between important parameters of the optical imaging lens 10 of the second embodiment is shown in FIG. 34 and FIG. 35.

The longitudinal spherical aberration of the second embodiment of the disclosure is as shown in FIG. 11A, deviations of the imaging points of the off-axis rays at different heights are controlled in a range of ±0.04 mm. In the two diagrams showing field curvature aberration of FIG. 11B and FIG. 11C, variations of the focal lengths of three representative wavelengths in the whole field of view fall in a range of ±0.12 mm. The diagram of distortion aberration of FIG. 11D shows that the distortion aberration of the second embodiment is maintained in a range of ±6%.

It is known from the above description that, the longitudinal spherical aberration and distortion aberration of the second embodiment are better than those of the first embodiment.

FIG. 14 is a schematic view of an optical imaging lens according to the third embodiment of the disclosure. FIG. 15A to FIG. 15D are schematic views showing the longitudinal spherical aberration and other aberrations of the optical imaging lens of the third embodiment. First, referring to FIG. 14, the optical imaging lens 10 of the third embodiment of the disclosure is similar to the optical imaging lens 10 of the first embodiment. They only slightly differ in some optical data, aspherical coefficients, and parameters related to the lens elements 1-8. Moreover, in the present embodiment, the optical axis region 523 of the image-side surface 52 of the fifth lens element 5 is concave. The periphery region 614 of the object-side surface 61 of the sixth lens element 6 is convex. The periphery region 624 of the image-side surface 62 of the sixth lens element 6 is concave. It should be noted that, for clarity, the reference numerals of some optical axis regions and periphery regions that are the same as those of the first embodiment are omitted from FIG. 14.

Detailed optical data of the optical imaging lens 10 of the third embodiment is shown in FIG. 16, and in the third embodiment, the effective focal length EFL of the optical imaging lens 10 is 6.370 mm, the half field of view HFOV is 41.507°, and the f-number (Fno) is 1.500. The system length TTL is 9.217 mm and the image height is 6.200 mm.

The aspherical coefficients of the object-side surface 11 of the first lens element 1 through the image-side surface 82 of the eighth lens element 8 in the equation (1) according to the third embodiment are shown in FIG. 17.

Furthermore, the relationship between important parameters of the optical imaging lens 10 of the third embodiment is shown in FIG. 34 and FIG. 35.

The longitudinal spherical aberration of the third embodiment of the disclosure is as shown in FIG. 15A, deviations of the imaging points of the off-axis rays at different heights are controlled in a range of ±0.025 mm. In the two diagrams showing field curvature aberration of FIG. 15B and FIG. 15C, variations of the focal lengths of three representative wavelengths in the whole field of view fall in a range of ±0.12 mm. The diagram of distortion aberration of FIG. 15D shows that the distortion aberration of the third embodiment is maintained in a range of ±10%.

It is known from the above description that, the half field of view HFOV of the third embodiment is greater than that of the first embodiment. Moreover, the longitudinal spherical aberration and distortion aberration of the third embodiment are better than those of the first embodiment.

FIG. 18 is a schematic view of an optical imaging lens according to the fourth embodiment of the disclosure. FIG. 19A to FIG. 19D are schematic views showing the longitudinal spherical aberration and other aberrations of the optical imaging lens of the fourth embodiment. First, referring to FIG. 18, the optical imaging lens 10 of the fourth embodiment of the disclosure is similar to the optical imaging lens 10 of the first embodiment. They only slightly differ in some optical data, aspherical coefficients, and parameters related to the lens elements 1-8. Moreover, in the present embodiment, the first lens element 1 has a negative refracting power. The optical axis region 113 of the object-side surface 11 of the first lens element 1 is concave, and its periphery region 114 is concave. The optical axis region 123 of the image-side surface 12 of the first lens element 1 is convex, and its periphery region 124 is convex. The second lens element 2 has a positive refracting power. The periphery region 214 of the object-side surface 12 of the second lens element 2 is concave, and the periphery region 224 of the image-side surface 22 is convex. The periphery region 524 of the image-side surface 52 of the fifth lens element 5 is convex. The periphery region 614 of the object-side surface 61 of the sixth lens element 6 is convex, and the optical axis region 623 of the image-side surface 62 is convex. It should be noted that, for clarity, the reference numerals of some optical axis regions and periphery regions that are the same as those of the first embodiment are omitted from FIG. 18.

Detailed optical data of the optical imaging lens 10 of the fourth embodiment is shown in FIG. 20, and in the fourth embodiment, the effective focal length EFL of the optical imaging lens 10 is 6.609 mm, the half field of view HFOV is 39.400°, and the f-number (Fno) is 1.500. The system length TTL is 13.711 mm and the image height is 6.200 mm.

The aspherical coefficients of the object-side surface 11 of the first lens element 1 through the image-side surface 82 of the eighth lens element 8 in the equation (1) according to the fourth embodiment are shown in FIG. 21.

Furthermore, the relationship between important parameters of the optical imaging lens 10 of the fourth embodiment is shown in FIG. 34 and FIG. 35.

The longitudinal spherical aberration of the fourth embodiment of the disclosure is as shown in FIG. 19A, deviations of the imaging points of the off-axis rays at different heights are controlled in a range of ±0.1 mm. In the two diagrams showing field curvature aberration of FIG. 19B and FIG. 19C, variations of the focal lengths of three representative wavelengths in the whole field of view fall in a range of ±0.3 mm. The diagram of distortion aberration of FIG. 19D shows that the distortion aberration of the fourth embodiment is maintained in a range of ±18%.

FIG. 22 is a schematic view of an optical imaging lens according to the fifth embodiment of the disclosure. FIG. 23A to FIG. 23D are schematic views showing the longitudinal spherical aberration and other aberrations of the optical imaging lens of the fifth embodiment. First, referring to FIG. 22, the optical imaging lens 10 of the fifth embodiment of the disclosure is similar to the optical imaging lens 10 of the first embodiment. They only slightly differ in some optical data, aspherical coefficients, and parameters related to the lens elements 1-8. Moreover, in the present embodiment, the optical axis region 413 of the object-side surface 41 of the fourth lens element 4 is concave. The optical axis region 523 of the image-side surface 52 of the fifth lens element 5 is concave, and its periphery region 524 is convex. It should be noted that, for clarity, the reference numerals of some optical axis regions and periphery regions that are the same as those of the first embodiment are omitted from FIG. 22.

Detailed optical data of the optical imaging lens 10 of the fifth embodiment is shown in FIG. 24, and in the fifth embodiment, the effective focal length EFL of the optical imaging lens 10 is 7.081 mm, the half field of view HFOV is 39.208°, and the f-number (Fno) is 1.500. The system length TTL is 9.456 mm and the image height is 6.200 mm.

The aspherical coefficients of the object-side surface 11 of the first lens element 1 through the image-side surface 82 of the eighth lens element 8 in the equation (1) according to the fifth embodiment are shown in FIG. 25.

Furthermore, the relationship between important parameters of the optical imaging lens 10 of the fifth embodiment is shown in FIG. 34 and FIG. 35.

The longitudinal spherical aberration of the fifth embodiment of the disclosure is as shown in FIG. 23A, deviations of the imaging points of the off-axis rays at different heights are controlled in a range of ±0.05 mm. In the two diagrams showing field curvature aberration of FIG. 23B and FIG. 23C, variations of the focal lengths of three representative wavelengths in the whole field of view fall in a range of ±0.07 mm. The diagram of distortion aberration of FIG. 23D shows that the distortion aberration of the fifth embodiment is maintained in a range of ±8%.

From the above description, it is known that the longitudinal spherical aberration, field curvature, and distortion aberration of the fifth embodiment are better than those of the first embodiment. In addition, the thickness difference between the optical axis of the lens and the periphery region of the fifth embodiment is smaller than that of the first embodiment. Therefore, the optical imaging lens of the fifth embodiment is easier to manufacture and thus has higher yield than the first embodiment.

FIG. 26 is a schematic view of an optical imaging lens according to the sixth embodiment of the disclosure. FIG. 27A to FIG. 27D are schematic views showing the longitudinal spherical aberration and other aberrations of the optical imaging lens of the sixth embodiment. First, referring to FIG. 26, the optical imaging lens 10 of the sixth embodiment of the disclosure is similar to the optical imaging lens 10 of the first embodiment. They only slightly differ in some optical data, aspherical coefficients, and parameters related to the lens elements 1-8. Moreover, in the present embodiment, the optical axis region 413 of the object-side surface 41 of the fourth lens element 4 is concave. The periphery region 524 of the image-side surface 52 of the fifth lens element 5 is convex. The optical axis region 623 of the image-side surface 62 of the sixth lens element 6 is convex. It should be noted that, for clarity, the reference numerals of some optical axis regions and periphery regions that are the same as those of the first embodiment are omitted from FIG. 26.

Detailed optical data of the optical imaging lens 10 of the sixth embodiment is shown in FIG. 28, and in the sixth embodiment, the effective focal length EFL of the optical imaging lens 10 is 7.038 mm, the half field of view HFOV is 40.579°, and the f-number (Fno) is 1.500. The system length TTL is 8.988 mm and the image height is 6.400 mm.

The aspherical coefficients of the object-side surface 11 of the first lens element 1 through the image-side surface 82 of the eighth lens element 8 in the equation (1) according to the sixth embodiment are shown in FIG. 29.

Furthermore, the relationship between important parameters of the optical imaging lens 10 of the sixth embodiment is shown in FIG. 34 and FIG. 36.

The longitudinal spherical aberration of the sixth embodiment of the disclosure is as shown in FIG. 27A, deviations of the imaging points of the off-axis rays at different heights are controlled in a range of ±0.03 mm. In the two diagrams showing field curvature aberration of FIG. 27B and FIG. 27C, variations of the focal lengths of three representative wavelengths in the whole field of view fall in a range of ±0.06 mm. The diagram of distortion aberration of FIG. 27D shows that the distortion aberration of the sixth embodiment is maintained in a range of ±7%.

From the above description, it is known that the longitudinal spherical aberration, field curvature, and distortion aberration of the sixth embodiment are better than those of the first embodiment. The image height of the sixth embodiment is greater than that of the first embodiment. Therefore, compared with the first embodiment, the sixth embodiment has better ISO under the same pixel.

FIG. 30 is a schematic view of an optical imaging lens according to the seventh embodiment of the disclosure. FIG. 31A to FIG. 31D are schematic views showing the longitudinal spherical aberration and other aberrations of the optical imaging lens of the seventh embodiment. First, referring to FIG. 30, the optical imaging lens 10 of the seventh embodiment of the disclosure is similar to the optical imaging lens 10 of the first embodiment. They only slightly differ in some optical data, aspherical coefficients, and parameters related to the lens elements 1-8. Moreover, in the present embodiment, the periphery region 124 of the image-side surface 12 of the first lens element 1 is convex. The third lens element 3 has a positive refracting power. The fourth lens element 4 has negative refracting power. The optical axis region 413 of the object-side surface 41 of the fourth lens element 4 is concave. The fifth lens element 5 has positive refracting power. The periphery region 524 of the image-side surface 52 of the fifth lens element 5 is convex. The optical axis region 623 of the image-side surface 62 of the sixth lens element 6 is convex. The seventh lens element 7 has negative refracting power. The eighth lens element 8 has positive refracting power. The optical axis region 823 of the image-side surface 82 of the eighth lens element 8 is convex. It should be noted that, for clarity, the reference numerals of some optical axis regions and periphery regions that are the same as those of the first embodiment are omitted from FIG. 30.

Detailed optical data of the optical imaging lens 10 of the seventh embodiment is shown in FIG. 32, and in the seventh embodiment, the effective focal length EFL of the optical imaging lens 10 is 6.951 mm, the half field of view HFOV is 34.182°, and the f-number (Fno) is 1.544. The system length TTL is 8.950 mm and the image height is 6.400 mm.

The aspherical coefficients of the object-side surface 11 of the first lens element 1 through the image-side surface 82 of the eighth lens element 8 in the equation (1) according to the seventh embodiment are shown in FIG. 33.

Furthermore, the relationship between important parameters of the optical imaging lens 10 of the seventh embodiment is shown in FIG. 34 and FIG. 36.

The longitudinal spherical aberration of the seventh embodiment of the disclosure is as shown in FIG. 31A, deviations of the imaging points of the off-axis rays at different heights are controlled in a range of ±0.06 mm. In the two diagrams showing field curvature aberration of FIG. 31B and FIG. 31C, variations of the focal lengths of three representative wavelengths in the whole field of view fall in a range of ±0.06 mm. The diagram of distortion aberration of FIG. 31D shows that the distortion aberration of the seventh embodiment is maintained in a range of ±35%.

From the above description, it is known that the field curvature aberration of the seventh embodiment is better than that of the first embodiment. The image height of the seventh embodiment is greater than that of the first embodiment. Therefore, compared with the first embodiment, the seventh embodiment has better ISO under the same pixel. In addition, the thickness difference between the optical axis of the lens and the periphery region of the seventh embodiment is smaller than that of the first embodiment. Therefore, the optical imaging lens of the seventh embodiment is easier to manufacture and thus has higher yield than the first embodiment.

Please also refer to FIG. 34, FIG. 35, and FIG. 36, which are table diagrams of various optical parameters pertaining to the first embodiment to the seventh embodiment.

In addition, when the material of the lens element meets the following configuration relationships, it facilitates to transfer and deflect the imaging rays, and effectively improves the chromatic aberration and enhances the imaging resolution.

In the optical imaging lens 10 of the embodiment of the disclosure, the following conditional expression is met: $V1+V2+V3+V4+V5 \leq 195.000$. Specifically, the preferred range is $135.000 \leq V1+V2+V3+V4+V5 \leq 195.000$.

In the optical imaging lens 10 of the embodiment of the disclosure, the following conditional expression is met: $V2+V3+V7<2*V6$, that is, the sum of the Abbe number of the second lens element 2, the Abbe number of the third lens element 3 and the Abbe number of the seventh lens element 7 is less than twice the Abbe number of the sixth lens element 6.

In the optical imaging lens 10 of the embodiment of the disclosure, the following conditional expression is met: $V3+V5+V7<2*V4$, that is, the sum of the Abbe number of the third lens element 3, the Abbe number of the fifth lens element 5 and the Abbe number of the seventh lens element 7 is less than twice the Abbe number of the fourth lens element 4.

In order to shorten the system length of the lens element and ensure the image quality, while taking into consideration the difficulty of production, the air gap between the lens elements is reduced or the thickness of the lens elements is decreased properly as a technical means. If the numerical limit of the following conditional expression is satisfied, it is possible for the embodiment of the disclosure to have a better configuration. When a preferable range is met, the aberration and distortion of the optical imaging lens 10 can be improved, and when a more preferable range is met, the spherical aberration can be further improved.

In the optical imaging lens 10 of the embodiment of the disclosure, the following conditional expression is further satisfied: $ALT/(G23+G78) \leq 3.000$, and the preferred range is $1.100 \leq ALT/(G23+G78) \leq 3.000$.

In the optical imaging lens 10 of the embodiment of the disclosure, the following conditional expression is further satisfied: $TL/BFL \geq 6.300$, and the preferred range is $6.300 \leq TL/BFL \leq 17.000$.

In the optical imaging lens 10 of the embodiment of the disclosure, the following conditional expression is further satisfied: $AAG/EFL \leq 1.100$, and the preferred range is $0.350 \leq AAG/EFL \leq 1.100$.

In the optical imaging lens 10 of the embodiment of the disclosure, the following conditional expression is further satisfied: $TTL/T1 \leq 12.000$, and the preferable range is $6.300 \leq TTL/T1 \leq 12.000$.

In the optical imaging lens 10 of the embodiment of the disclosure, the following conditional expression is further satisfied: $EFL/(T5+T6+T7) \geq 3.500$, and the preferred range is $3.500 \leq EFL/(T5+T6+T7) \leq 6.200$.

In the optical imaging lens 10 of the embodiment of the disclosure, the following conditional expression is further satisfied: $ALT/(Tmax+G78) \leq 2.300$, and the preferred range is $0.950 \leq ALT/(Tmax+G78) \leq 2.300$.

In the optical imaging lens 10 of the embodiment of the disclosure, the following conditional expression is further satisfied: $(T1+G12+T2+G23+T3)/BFL \geq 2.300$, and the preferred range is $2.300 \leq (T1+G12+T2+G23+T3)/BFL \leq 7.200$.

In the optical imaging lens 10 of the embodiment of the disclosure, the following conditional expression is further satisfied: $AAG/(T3+G34+T4) \geq 2.000$, and the preferred range is $2.000 \leq AAG/(T3+G34+T4) \leq 4.900$.

In the optical imaging lens 10 of the embodiment of the disclosure, the following conditional expression is further satisfied: $TTL/(EFL+BFL) \leq 2.500$, and the preferred range is $1.000 \leq TTL/(EFL+BFL) \leq 2.500$.

In the optical imaging lens 10 of the embodiment of the disclosure, the following conditional expression is further satisfied: $(T1+T4)/(T6+T7) \geq 1.000$, and the preferred range is $1.000 \leq (T1+T4)/(T6+T7) \leq 2.500$.

In the optical imaging lens 10 of the embodiment of the disclosure, the following conditional expression is further satisfied: $ALT/(T1+T4) \leq 2.900$, and the preferred range is $1.650 \leq ALT/(T1+T4) \leq 2.900$.

In the optical imaging lens 10 of the embodiment of the disclosure, the following conditional expression is further satisfied: $(T4+G45+T5+G56+T6)/BFL \geq 2.000$, and the preferred range is $2.000 \leq (T4+G45+T5+G56+T6)/BFL \leq 5.900$.

In the optical imaging lens 10 of the embodiment of the disclosure, the following conditional expression is further satisfied: $AAG/(T6+G67) \geq 3.700$, and the preferred range is $3.700 \leq AAG/(T6+G67) \leq 5.500$.

In the optical imaging lens 10 of the embodiment of the disclosure, the following conditional expression is further satisfied: $TL/(EFL+Tmax) \leq 1.500$, and the preferred range is $0.850 \leq TL/(EFL+Tmax) \leq 1.500$.

In the optical imaging lens 10 of the embodiment of the disclosure, the following conditional expression is further satisfied: $T8/T7 \geq 0.950$, and the preferred range is $0.950 \leq T8/T7 \leq 1.800$.

Moreover, any combination of the parameters in the embodiments can be selected to increase the limitation to the lens, so as to facilitate the lens design of the disclosure with the same architecture.

In view of the unpredictability of the optical system design, under the framework of the disclosure, satisfying the above conditional expressions can better shorten the system length, reduce the f-number, increase the image height, improve the image quality, or enhance assemble yield rate of the disclosure, thereby overcoming the defects of the conventional technology. In the meantime, the use of plastic material for the lens element of the embodiments of the disclosure can further reduce the weight of the lens and save the cost.

The numerical range including the maximum and minimum values obtained from the combination ratio relationship of the optical parameters disclosed in the various embodiments of the disclosure can be implemented accordingly.

In summary, the optical imaging lens of the embodiments of the disclosure can achieve the following effects and advantageous effect.

I. According to the embodiments of the disclosure, the longitudinal spherical aberration, field curvature aberration, and distortion are all complied with usage specifications. In addition, the off-axis rays of the three representative wavelengths (i.e., red, green, and blue) at different heights all gather in the vicinity of the imaging points. According to the deviation of each curve, it is known that deviations of the imaging points of the off-axis rays at different heights are under control, such that spherical aberration, aberration, and distortion are suppressed properly. The data of the image quality also shows that the distances between the three representative wavelengths (i.e., red, green, and blue) are fairly close, which indicates that rays of different wavelengths are gathered and dispersion is suppressed properly under all conditions. To sum up, in the disclosure, excellent image quality is achieved through design and arrangement of the lens elements.

II. Under the condition that the periphery region of the object-side surface of the third lens element is concave, the periphery region of the image-side surface of the third lens element is convex, the periphery region of the object-side surface of the fourth lens element is convex, the sixth lens element has positive refracting power, and the optical axis region of the object-side surface of the sixth lens element is convex, it is possible for the optical imaging lens to have good image quality and increase luminous flux. Through the ratio limit of D11t62/D71t82≤2.400, the system length can be effectively controlled to achieve the effect of volume reduction. In combination with one of the designs that the periphery region of the image-side surface of the seventh lens element is convex or the periphery region of the image-side surface of the eighth lens element is convex, the large-angle imaging rays may be corrected, so that the imaging rays can be converged successfully, and the aberration on the edge of the image plane may be further improved. A preferred range of D11t62/D71t82 is 1.400≤D11t62/D71t82≤2.400.

III. Under the condition that the periphery region of the object-side surface of the third lens element is concave, the periphery region of the image-side surface of the third lens element is convex, the sixth lens element has positive refracting power, the optical axis region of the object-side surface of the sixth lens element is convex, the optical axis region of the object-side surface of the eighth lens element is concave, and the optical axis region of the image-side surface of the seventh lens element is concave, it is possible for the optical imaging lens to have good image quality and increase luminous flux. Through the ratio limit of D31t62/D71t82≤1.500, the system length can be effectively controlled to achieve the effect of volume reduction. In combination with design that the periphery region of the object-side surface of the eighth lens element is convex, the large-angle imaging rays may be corrected, so that the imaging rays can be converged successfully, and the aberration on the edge of the image plane may be further improved. A preferred range of D31t62/D71t82 is 0.750≤D31t62/D71t82≤1.500.

IV. The lens elements in various embodiments of the disclosure adopt aspheric surface design, thereby facilitating to optimize image quality.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \le A \le \alpha_1$ or $\beta_2 \le B \le \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression E or E≤$\gamma_2$ or $\gamma_2$≤E≤$\gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Although the disclosure has been disclosed as above by way of embodiments, it is not intended to limit the disclosure. Any person with ordinary knowledge in the technical field can make some changes and decorations without departing from the spirit and scope of the disclosure, so the protection scope of the disclosure shall be determined by the scope of the attached claims.

What is claimed is:

1. An optical imaging lens, comprising a first lens element, a second lens element, a third lens element, a fourth lens element, a fifth lens element, a sixth lens element, a seventh lens element, and an eighth lens element sequentially arranged along an optical axis from an object side to an image side, wherein each of the first lens element to the eighth lens element comprises an object-side surface facing the object side and allowing imaging rays to pass through and an image-side surface facing the image side and allowing the imaging rays to pass through;

a periphery region of the object-side surface of the third lens element is concave, and a periphery region of the image-side surface of the third lens element is convex;

a periphery region of the object-side surface of the fourth lens element is convex;

the sixth lens element has positive refracting power, and an optical axis region of the object-side surface of the sixth lens element is convex;

a periphery region of the image-side surface of the seventh lens element is convex;

wherein lens elements of the optical imaging lens are only the eight lens elements described above, and the optical imaging lens satisfies the following condition: D11t62/D71t82≤2.400, wherein D11t62 is a distance from the object-side surface of the first lens element to the image-side surface of the sixth lens element along the optical axis, and D71t82 is a distance from the object-side surface of the seventh lens element to the image-side surface of the eighth lens element along the optical axis.

2. The optical imaging lens according to claim 1, wherein the optical imaging lens further satisfies the following conditional expression: V1+V2+V3+V4+V5≤195.000, wherein V1 is an Abbe number of the first lens element, V2 is an Abbe number of the second lens element, V3 is an Abbe number of the third lens element, V4 is an Abbe number of the fourth lens element, and V5 is an Abbe number of the fifth lens element.

3. The optical imaging lens according to claim 1, wherein the optical imaging lens further satisfies the following conditional expression: ALT/(G23+G78)≤3.000, wherein ALT is a sum of thicknesses of the first lens element through the eighth lens element along the optical axis, G23 is an air gap between the second lens element and the third lens element along the optical axis, and G78 is an air gap between the seventh lens element and the eighth lens element along the optical axis.

4. The optical imaging lens according to claim 1, wherein the optical imaging lens further satisfies the following conditional expression: TL/BFL≥6.300, wherein TL is a distance from the object-side surface of the first lens element to the image-side surface of the eighth lens element along the optical axis, and BFL is a distance from the image-side surface of the eighth lens element to an image plane along the optical axis.

5. The optical imaging lens according to claim 1, wherein the optical imaging lens further satisfies the following conditional expression: AAG/EFL≤1.100, wherein AAG is a sum of seven air gaps respectively between the first lens element through the eighth lens element along the optical axis, and EFL is an effective focal length of the optical imaging lens.

6. The optical imaging lens according to claim 1, wherein the optical imaging lens further satisfies the following conditional expression: TTL/T1≤12.000, wherein TTL is a distance from the object-side surface of the first lens element to an image plane along the optical axis, and T1 is a thickness of the first lens element along the optical axis.

7. The optical imaging lens according to claim 1, wherein the optical imaging lens further satisfies the following conditional expression: EFL/(T5+T6+T7)≥3.500, wherein EFL is an effective focal length of the optical imaging lens, T5 is a thickness of the fifth lens element along the optical axis, T6 is a thickness of the sixth lens element along the optical axis, and T7 is a thickness of the seventh lens element along the optical axis.

8. An optical imaging lens, comprising a first lens element, a second lens element, a third lens element, a fourth lens element, a fifth lens element, a sixth lens element, a seventh lens element, and an eighth lens element sequentially arranged along an optical axis from an object side to an image side, wherein each of the first lens element to the eighth lens element comprises an object-side surface facing the object side and allowing imaging rays to pass through and an image-side surface facing the image side and allowing the imaging rays to pass through;
 a periphery region of the object-side surface of the third lens element is concave, and a periphery region of the image-side surface of the third lens element is convex;
 a periphery region of the object-side surface of the fourth lens element is convex;
 the sixth lens element has positive refracting power, and an optical axis region of the object-side surface of the sixth lens element is convex;
 a periphery region of the image-side surface of the eighth lens element is convex;
 wherein lens elements of the optical imaging lens are only the eight lens elements described above, and the optical imaging lens satisfies the following condition: D11t62/D71t82≤2.400, wherein D11t62 is a distance from the object-side surface of the first lens element to the image-side surface of the sixth lens element along the optical axis, and D71t82 is a distance from the object-side surface of the seventh lens element to the image-side surface of the eighth lens element along the optical axis.

9. The optical imaging lens according to claim 8, wherein the optical imaging lens further satisfies the following conditional expression: V2+V3+V7<2*V6, wherein V2 is an Abbe number of the second lens element, V3 is an Abbe number of the third lens element, V6 is an Abbe number of the sixth lens element, and V7 is an Abbe number of the seventh lens element.

10. The optical imaging lens according to claim 8, wherein the optical imaging lens further satisfies the following conditional expression: ALT/(Tmax+G78)≤2.300, wherein ALT is a sum of thicknesses of eight lens elements of the first lens element through the eighth lens element along the optical axis, Tmax is a maximum value of the thicknesses of the first lens element through the eighth lens element along the optical axis, and G78 is an air gap between the seventh lens element and the eighth lens element along the optical axis.

11. The optical imaging lens according to claim 8, wherein the optical imaging lens further satisfies the following conditional expression: (T1+G12+T2+G23+T3)/BFL≥2.300, wherein T1 is a thickness of the first lens element along the optical axis, T2 is a thickness of the second lens element along the optical axis, T3 is a thickness of the third lens element along the optical axis, G12 is an air gap between the first lens element and the second lens element along the optical axis, G23 is an air gap between the second lens element and the third lens element along the optical axis, and BFL is a distance from the image-side surface of the eighth lens element to an image plane along the optical axis.

12. The optical imaging lens according to claim 8, wherein the optical imaging lens further satisfies the following conditional expression: AAG/(T3+G34+T4)≥2.000, wherein AAG is a sum of seven air gaps respectively between the first lens element through the eighth lens element along the optical axis, T3 is a thickness of the third lens element along the optical axis, T4 is a thickness of the fourth lens element along the optical axis, and G34 is an air gap between the third lens element and the fourth lens element along the optical axis.

13. The optical imaging lens according to claim 8, wherein the optical imaging lens further satisfies the following conditional expression: TTL/(EFL+BFL)≤2.500, wherein TTL is a distance from the object-side surface of the first lens element to an image plane along the optical axis, EFL is an effective focal length of the optical imaging lens, and BFL is a distance from the image-side surface of the eighth lens element to the image plane along the optical axis.

14. The optical imaging lens according to claim 8, wherein the optical imaging lens further satisfies the following conditional expression: $(T1+T4)/(T6+T7) \geq 1.000$, wherein T1 is a thickness of the first lens element along the optical axis, T4 is a thickness of the fourth lens element along the optical axis, T6 is a thickness of the sixth lens element along the optical axis, and T7 is a thickness of the seventh lens element along the optical axis.

15. An optical imaging lens, comprising a first lens element, a second lens element, a third lens element, a fourth lens element, a fifth lens element, a sixth lens element, a seventh lens element, and an eighth lens element sequentially arranged along an optical axis from an object side to an image side, wherein each of the first lens element to the eighth lens element comprises an object-side surface facing the object side and allowing imaging rays to pass through and an image-side surface facing the image side and allowing the imaging rays to pass through;
  a periphery region of the object-side surface of the third lens element is concave, and a periphery region of the image-side surface of the third lens element is convex;
  the sixth lens element has positive refracting power, and an optical axis region of the object-side surface of the sixth lens element is convex;
  an optical axis region of the image-side surface of the seventh lens element is concave;
  an optical axis region of the object-side surface of the eighth lens element is concave, and a periphery region of the object-side surface of the eighth lens element is convex;
  wherein lens elements of the optical imaging lens are only the eight lens elements described above, and the optical imaging lens satisfies the following condition: $D31t62/D71t82 \leq 1.500$, wherein D31t62 is a distance from the object-side surface of the third lens element to the image-side surface of the sixth lens element along the optical axis, and D71t82 is a distance from the object-side surface of the seventh lens element to the image-side surface of the eighth lens element along the optical axis.

16. The optical imaging lens according to claim 15, wherein the optical imaging lens further satisfies the following conditional expression: $V3+V5+V7<2*V4$, wherein V3 is an Abbe number of the third lens element, V4 is an Abbe number of the fourth lens element, V5 is an Abbe number of the fifth lens element, and V7 is an Abbe number of the seventh lens element.

17. The optical imaging lens according to claim 15, wherein the optical imaging lens further satisfies the following conditional expression: $ALT/(T1+T4) \leq 2.900$, wherein ALT is a sum of thicknesses of eight lens elements of the first lens element through the eighth lens element along the optical axis, T1 is the thickness of the first lens element along the optical axis, and T4 is the thickness of the fourth lens element along the optical axis.

18. The optical imaging lens according to claim 15, wherein the optical imaging lens further satisfies the following conditional expression: $(T4+G45+T5+G56+T6)/BFL \geq 2.000$, wherein T4 is a thickness of the fourth lens element along the optical axis, T5 is a thickness of the fifth lens element along the optical axis, T6 is a thickness of the sixth lens element along the optical axis, G45 is an air gap between the fourth lens element and the fifth lens element along the optical axis, G56 is an air gap between the fifth lens element and the sixth lens element along the optical axis, and BFL is a distance from the image-side surface of the eighth lens element to an image plane along the optical axis.

19. The optical imaging lens according to claim 15, wherein the optical imaging lens further satisfies the following conditional expression: $AAG/(T6+G67) \geq 3.700$, wherein AAG is a sum of seven air gaps respectively between the first lens element through the eighth lens element along the optical axis, T6 is a thickness of the sixth lens element along the optical axis, and G67 is an air gap between the sixth lens element and the seventh lens element along the optical axis.

20. The optical imaging lens according to claim 15, wherein the optical imaging lens further satisfies the following conditional expression: $TL/(EFL+Tmax) \leq 1.500$, wherein TL is a distance from the object-side surface of the first lens element to the image-side surface of the eighth lens element along the optical axis, EFL is an effective focal length of the optical imaging lens, and Tmax is a maximum value of thicknesses of the first lens element through the eighth lens element along the optical axis.

* * * * *